United States Patent
Handte et al.

(10) Patent No.: US 10,827,496 B2
(45) Date of Patent: Nov. 3, 2020

(54) COMMUNICATION DEVICES AND METHODS FOR RF-BASED COMMUNICATION AND POSITION DETERMINATION

(71) Applicant: Sony Corporation, Tokyo (JP)

(72) Inventors: Thomas Handte, Stuttgart (DE); Dana Ciochina, Stuttgart (DE); Daniel Schneider, Stuttgart (DE); Nabil Sven Loghin, Stuttgart (DE); Ben Eitel, Stuttgart (DE); Felix Fellhauer, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/330,102

(22) PCT Filed: Aug. 17, 2017

(86) PCT No.: PCT/EP2017/070841
§ 371 (c)(1),
(2) Date: Mar. 4, 2019

(87) PCT Pub. No.: WO2018/046271
PCT Pub. Date: Mar. 15, 2018

(65) Prior Publication Data
US 2019/0200339 A1 Jun. 27, 2019

(30) Foreign Application Priority Data

Sep. 9, 2016 (EP) .................................... 16188111
Jan. 9, 2017 (EP) .................................... 17150690

(51) Int. Cl.
*H04B 7/08* (2006.01)
*H04W 72/04* (2009.01)
(Continued)

(52) U.S. Cl.
CPC ......... *H04W 72/046* (2013.01); *G01S 5/0273* (2013.01); *H04B 7/0617* (2013.01);
(Continued)

(58) Field of Classification Search
CPC ..... H04W 64/00; H04W 16/28; H04W 40/20; H04W 4/008; H04W 64/006; G01S 11/08;
(Continued)

(56) References Cited

U.S. PATENT DOCUMENTS 6,009,334 A * 12/1999 Grubeck ............... H04W 64/00
455/456.2
9,148,752 B2 9/2015 Hart
(Continued)

FOREIGN PATENT DOCUMENTS

| EP | 1034677 A1 | 9/2000 |
|---|---|---|
| WO | 2015/054324 A2 | 4/2015 |
| WO | 2015/130618 A2 | 9/2015 |

OTHER PUBLICATIONS

Li et al., "Super-Resolution TOA Estimation With Diversity for Indoor Geolocation", IEEE transactions on wireless communications, vol. 3, No. 1, Jan. 2004, pp. 224-234.
(Continued)

*Primary Examiner* — Nathan S Taylor
(74) *Attorney, Agent, or Firm* — Xsensus LLP

(57) ABSTRACT

Communication devices and corresponding methods for RF-based communication and position determination are disclosed. An initiator communication device (1) comprises an antenna unit (10) configured to transmit and receive RF signals, a beamforming unit (11) configured to perform beamforming and to control the antenna unit to transmit and/or receive RF signals using one or more selected beams, a control unit (12) configured to control the beamforming
(Continued)

unit (11) in a training phase to perform beamforming for determining an initiator line of sight (LOS), beam to a responder communication device (2), and a processing unit (13) configured to determine the initiator LOS beam and/or initiator angular information of the initiator LOS beam and to determine the position of said communication device using the determined initiator LOS beam and/or initiator angular information in a measurement phase.

20 Claims, 15 Drawing Sheets

(51) Int. Cl.
  *H04B 7/06*   (2006.01)
  *H04W 64/00*   (2009.01)
  *G01S 5/02*   (2010.01)
(52) U.S. Cl.
  CPC ....... *H04W 64/006* (2013.01); *H04W 72/048* (2013.01); *H04W 72/0446* (2013.01)
(58) Field of Classification Search
  CPC ....... G01S 5/0205; G01S 5/06; H04B 7/0617; H04B 7/086
  USPC .................... 342/457; 455/440, 456.1, 456.2
  See application file for complete search history.

(56) References Cited

U.S. PATENT DOCUMENTS

| | | | | |
|---|---|---|---|---|
| 9,253,592 | B1* | 2/2016 | Moscovich | H04W 4/80 |
| 9,642,167 | B1* | 5/2017 | Snyder | H04W 4/021 |
| 2009/0051593 | A1* | 2/2009 | Wiesbeck | G01S 7/2813 |
| | | | | 342/372 |
| 2010/0164802 | A1* | 7/2010 | Li | H01Q 1/246 |
| | | | | 342/372 |
| 2012/0246265 | A1* | 9/2012 | Bajko | H04J 3/0667 |
| | | | | 709/217 |
| 2013/0089000 | A1* | 4/2013 | Hansen | H04B 7/0617 |
| | | | | 370/254 |
| 2014/0187259 | A1* | 7/2014 | Kakani | H04W 64/00 |
| | | | | 455/456.1 |
| 2014/0204793 | A1* | 7/2014 | Ben-Haim | H04W 24/00 |
| | | | | 370/253 |
| 2014/0269549 | A1* | 9/2014 | Stephens | H04W 74/0891 |
| | | | | 370/329 |
| 2014/0295877 | A1* | 10/2014 | Hart | H04W 4/02 |
| | | | | 455/456.1 |
| 2015/0063228 | A1* | 3/2015 | Aldana | G01S 5/0081 |
| | | | | 370/329 |
| 2015/0099538 | A1* | 4/2015 | Wang | H04W 4/02 |
| | | | | 455/456.1 |
| 2015/0131752 | A1* | 5/2015 | Harel | H04B 7/0871 |
| | | | | 375/267 |
| 2015/0222602 | A1* | 8/2015 | Steiner | H04L 63/0428 |
| | | | | 713/168 |
| 2015/0264530 | A1* | 9/2015 | Prechner | H04W 4/025 |
| | | | | 455/456.2 |
| 2016/0202344 | A1* | 7/2016 | Sanderovich | G01S 5/06 |
| | | | | 455/456.1 |
| 2016/0227368 | A1* | 8/2016 | Sanderovich | H04W 4/023 |
| 2016/0274229 | A1* | 9/2016 | Oh | G01S 19/24 |
| 2017/0070275 | A1* | 3/2017 | Jo | H04B 7/0619 |
| 2017/0127412 | A1* | 5/2017 | Amizur | G01S 13/74 |
| 2018/0115439 | A1* | 4/2018 | Bhatti | H04B 17/364 |
| 2019/0081674 | A1* | 3/2019 | Oteri | H04B 7/0421 |
| 2019/0141556 | A1* | 5/2019 | Kasher | H04L 1/18 |
| 2019/0182793 | A1* | 6/2019 | Wang | G01S 5/0215 |
| 2020/0153498 | A1* | 5/2020 | Kotecha | H04B 7/043 |

OTHER PUBLICATIONS

IEEE, "Wireless LAN Medium Access Control (MAC) and Physical Layer (PHY) Specifications", IEEE P802.11-REVmc™/D8.0, Aug. 2016, 3774 pages.

IEEE, "Wireless LAN Medium Access Control (MAC) and Physical Layer (PHY) Specifications", IEEE Std 802.11ad™, Dec. 28, 2012, 628 pages.

Nitsche et al., "IEEE 802.11ad: Directional 60 GHz Communication for Multi-Gbps Wi-Fi", pp. 1-10.

Chellappa et al., "Applications of Array Signal Processing", Academic Press Library in Signal Processing, vol. 3, 16 pages.

Segev et al., "Next Generation Positioning Overview and Challenges", IEEE 11-14/1464r0, Nov. 2014, pp. 1-28.

International Search Report dated Nov. 2, 2017 for PCT/EP2017/070841 filed on Aug. 17, 2017, 10 pages.

* cited by examiner

| B0 | B8 | B9 | B10 | B11 | B15 | B16 | B17 | B23 |
|---|---|---|---|---|---|---|---|---|
| Total Sectors in ISS | | Number of RX DMG Antennas | | Reserved | | Poll Required | Reserved | |

Bits: 9, 2, 5, 1, 7

Fig. 15A

| B0 | B5 | B6 | B7 | B8 | B15 | B16 | B17 | B23 |
|---|---|---|---|---|---|---|---|---|
| Sector Select | | DMG Antenna Select | | SNR Report | | Poll Required | Reserved | |

Bits: 6, 2, 8, 1, 7

Fig. 15B

| Frame Control | Duration | RA | TA | SSW Feedback | BRP Request | Beamformed Link Maintenance | FCS |
|---|---|---|---|---|---|---|---|

Octets: 2, 2, 6, 6, 3, 4, 1, 4

Fig. 16A

| Frame Control | Duration | RA | TA | SSW Feedback | BRP Request | Beamformed Link Maintenance | SSW Feedback (for positioning) | FCS |
|---|---|---|---|---|---|---|---|---|

Octets: 2, 2, 6, 6, 3, 4, 1, 3, 4

Fig. 16B

| B0 B4 | B5 | B6 | B7 | B8 | B9 | B10 | B11 B16 | B17 B24 | B25 B26 | B27 B31 |
|---|---|---|---|---|---|---|---|---|---|---|
| L-RX | TX-TRN-REQ | MID-REQ | BC-REQ | MID-Grant | BC-Grant | Chan-FBCK-CAP | TX Sector ID | Other_AID | TX Antenna ID | Reserved |

Bits: 5, 1, 1, 1, 1, 1, 1, 6, 8, 2, 5

Fig. 17

| B0 | B1 | B2 | B3 | B4 B5 | B6 | B7 B13 |
|---|---|---|---|---|---|---|
| Reverse Direction | Higher Layer Timer Synchronization | TPC | SPSH and Interference Mitigation | Number of RX DMG Antennas | Fast Link Adaptation | Total Number of Sectors |
| Bits: 1 | 1 | 1 | 1 | 2 | 1 | 7 |

| B14 B19 | B20 | B21 B26 | B27 | B28 B51 | B52 |
|---|---|---|---|---|---|
| RXSS Length | DMG Antenna Reciprocity | A-MPDU Parameters | BA with Flow Control | Supported MCS Set | DTP Supported |
| Bits: 6 | 1 | 6 | 1 | 24 | 1 |

| B53 | B54 | B55 | B56 | B57 B59 | B60 | B61 | B62 B63 |
|---|---|---|---|---|---|---|---|
| A-PPDU Supported | Heartbeat | Supports Other_AID | Antenna Pattern Reciprocity | Heartbeat Elapsed Indication | Grant ACK Supported | RXSSTx-Rate Supported | Reserved |
| Bits: 1 | 1 | 1 | 1 | 3 | 1 | 1 | 2 |

Fig. 18

| B0 | B1 | B2 B5 | B6 | B7 B9 | B10 B13 | B14 |
|---|---|---|---|---|---|---|
| CC Present | Discovery Mode | Next Beacon | ATI Present | A-BFT Length | FSS | IsResponderTXSS |
| Bits: 1 | 1 | 4 | 1 | 3 | 4 | 1 |

| B15 B18 | B19 | B20 B26 | B27 B30 | B31 B36 | B37 B42 | B43 | B44 B47 |
|---|---|---|---|---|---|---|---|
| Next A-BFT | Fragmented TXSS | TXSS Span | N BIs A-BFT | A-BFT Count | N A-BFT in Ant | PCP Association Ready | Reserved |
| Bits: 4 | 1 | 7 | 4 | 6 | 6 | 1 | 4 |

Fig. 19

COMMUNICATION DEVICES AND METHODS FOR RF-BASED COMMUNICATION AND POSITION DETERMINATION

CROSS-REFERENCE TO RELATED APPLICATIONS

The present application is based on PCT filing PCT/EP2017/070841, filed Aug. 17, 2017, which claims priority to EP 16188111.5 filed Sep. 9, 2016, and EP 17150690.0, filed Jan. 9, 2017, the entire contents of which are incorporated herein by reference.

BACKGROUND

Field of the Disclosure

The present disclosure relates to communication devices and communication methods for RF-based communication and acquisition of information for use in position determination.

Description of Related Art

The use of RF signals for indoor positioning is a possible future key technology. However, RF-based positioning often suffers from non-line-of-sight (NLOS) propagation, i.e. the receiver receives multiple time-delayed and attenuated copies of the transmit signal due to signal reflections and refractions but the direct propagation path is missing or at least strongly attenuated. Hence, there is a need for improved ways enabling indoor positioning using RF signals conventionally used for communication purposes.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide communication devices and methods that enable and improve indoor positioning using RF signals. It is a further object to provide a corresponding computer program and a non-transitory computer-readable recording medium for implementing for implementing said methods.

According to an aspect there is provided a communication device for RF-based communication and position determination, said communication device comprising:
an antenna unit configured to transmit and receive RF signals,
a beamforming unit configured to perform beamforming and to control the antenna unit to transmit and/or receive RF signals using one or more selected beams,
a control unit configured to control the beamforming unit in a training phase to perform beamforming for determining an initiator line of sight, LOS, beam to a responder communication device, and
a processing unit configured to determine the initiator LOS beam and/or initiator angular information of the initiator LOS beam and to determine the position of said communication device using the determined initiator LOS beam and/or initiator angular information in a measurement phase.

According to a further aspect there is provided a communication method for use by an initiator communication device for RF-based communication with a responder communication device and for position determination of the initiator communication device, said communication method comprising:
controlling the initiator communication device to perform beamforming in a training phase for determining an initiator line of sight, LOS, beam from the initiator communication device to the responder communication device,
determining the initiator LOS beam, and/or determining initiator angular information of the initiator LOS beam
determining the position of the initiator communication device using the determined initiator LOS beam and/or initiator angular information in a measurement phase.

According to an aspect there is provided a communication device for RF-based communication and position determination, said communication device comprising:
an antenna unit configured to transmit and receive RF signals,
a beamforming unit configured to perform beamforming and to control the antenna unit to transmit and/or receive RF signals using one or more selected beams,
a control unit configured to control the beamforming unit in a training phase to perform beamforming for determining a responder line of sight, LOS, beam to an initiator communication device, and
a processing unit configured to determine the responder LOS beam and/or responder angular information of the responder LOS beam and to determine the position of the initiator communication device using the determined responder LOS beam and/or responder angular information in a measurement phase.

According to a further aspect there is provided a communication method for use by a responder communication device for RF-based communication with an initiator communication device and for position determination of the initiator communication device, said communication method comprising:
controlling the responder communication device to perform beamforming in a training phase for determining a responder line of sight, LOS, beam to the initiator communication device,
determining the responder LOS beam and/or responder angular information of the responder LOS beam, and
determine the position of the initiator communication device using the determined responder LOS beam and/or responder angular information in a measurement phase for determining the position of the initiator communication device.

According to still further aspects a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to apply beamforming for RF-based positioning. Beamforming provides means to resolve major issues in RF indoor localization such as NLOS signal propagation and LOS path retrieval, i.e. it is easier or even possible at all to differentiate between LOS and NLOS components in an impulse response, also because the LOS path in impulse response can be strongly attenuated and because angular information of beamforming sectors can be wrong as a consequence. Beamforming particularly provides means to increase detection probability of LOS path in impulse response. Further, while conventional beamforming is used to maximize channel capacity, it is used according to the present disclosure to increase detection probability of the LOS path, e.g. by minimizing time of arrival and by applying beamforming to suppress NLOS components coming from other directions than the beam main lobe. Thus, the present disclosure enables a more reliable use of sector angular information for positioning since LOS path detection probability is increased.

For the subsequent exchange of RF signals between the communication devices in a measurement phase, in which the acquired information can be used for position determination of the initiator communication device, either absolutely or with respect to the responder communication device, a communication channel is used. The communication channel consists preferably of a LOS path, but may still have NLOS components. However, due to the use of beamforming as disclosed, NLOS components are attenuated compared to the LOS component so that the communication channel substantially corresponds to the LOS path.

The disclosed way of acquiring information for use in position determination may be applied with Wireless LAN (WLAN) in the 60 GHz frequency band (as e.g. described in IEEE 802.11ad). Further, changes to the existing positioning protocol FTM (Fine Time Measurement) and to 60 GHz WLAN standards (IEEE 802.11ad/ay) may be made as disclosed herein, which enable enhanced positioning employing beamforming. Particularly in communication systems that feature beamforming inherently (such as mm-wave systems operating at 60 GHz for example) the disclosed devices and methods may favorably be applied. However, the disclosure is not limited to mm-wave systems.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 15 shows diagrams illustrating a conventional SSW feedback field format;

FIG. 16 shows a diagram illustrating a known SSW feedback field format and an embodiment of a SSW feedback field format according to the present disclosure;

FIG. 17 shows a diagram illustrating a BRP Request field format;

FIG. 18 shows diagrams illustrating a DMG STA Capability Information field format;

FIG. 19 shows diagrams illustrating a Beacon Interval Control field format;

DETAILED DESCRIPTION OF THE EMBODIMENTS

In the past few years, data transmission in the 60 GHz frequency band (mm-wave) has attracted attention since it is a promising alternative to the congested frequency bands in the unlicensed spectrum at 2.4 and 5 GHz. Furthermore, high bandwidths (>2 GHz) are available which allow for high data rate in excess of several Gbps. However, free space path loss is significantly higher compared to the 2.4 and 5 GHz band due to the high frequency and oxygen absorption in the 60 GHz frequency band. In order to anyway achieve reasonable link lengths, directional communications by beamforming is applied. Thereby, transmitter and/or receiver feature steerable antenna arrays, which can form a directive beam towards the remote station. The employed beams feature a large gain (to overcome high path loss) but have a very narrow spatial shape. Thus, beam alignment is crucial for good system performance.

Figure 1:
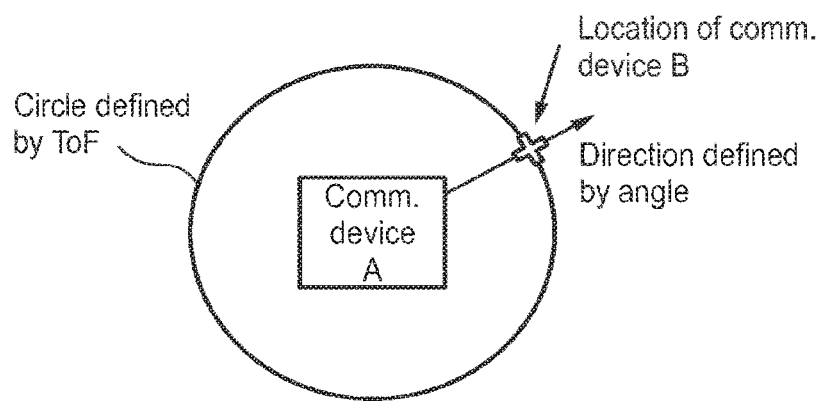
FIG. 1 shows a diagram generally illustrating positioning using ToF and angular information.

Besides, 60 GHz communication systems have also good properties for positioning. The high sampling frequency which is required to resolve large bandwidths allows for highly accurate timing measurements between transmitter and receiver without applying rather complex super resolution algorithms. Timing measurements are used to determine the time of flight (ToF) between two communication devices. For example, 2 GHz sampling frequency results in range measurements with a maximum error of ±7.5 cm. Further, the direction of a beam holds angular information, which gives the direction of the device location. As shown in FIG. 1, both timing and angular information can be readily used to determine the position of a communication device B relative to a communication device A. In two dimensions, timing information defines a circle whereas angular information gives the circle segment where device B is located. In contrast to other positioning techniques such as triangulation, which require several anchors with known location, this positioning technique requires only a single anchor (communication device A). In three dimensions, ToF and angular information define a spherical segment. Based on this information, a relative positioning estimate can be obtained, which may be already sufficient for some applications. If the absolute position is required for device B, then the absolute position of device A needs to be known.

The optimum beam alignment between communication device A and B depends on the link application. If the link is applied for data communications (which is the case in the IEEE802.11ad amendment), the best beam is defined by the beam(s) or sector(s) which maximize(s) channel capacity. In case of SISO systems, i.e. communication device A and B have only one transmit or receive antenna array, this is equal to maximizing received power or signal-to-noise ratio (SNR). However, this beam alignment strategy is not optimal for positioning and can lead to wrong positioning information.

Figure 2A:
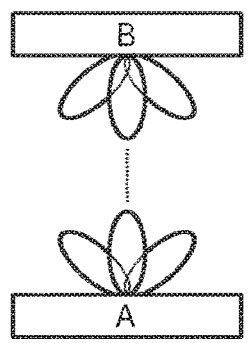
FIG. 2 shows diagrams generally illustrating a LOS and a NLOS scenario where beamforming is performed which maximizes channel capacity.
Figure 2B:
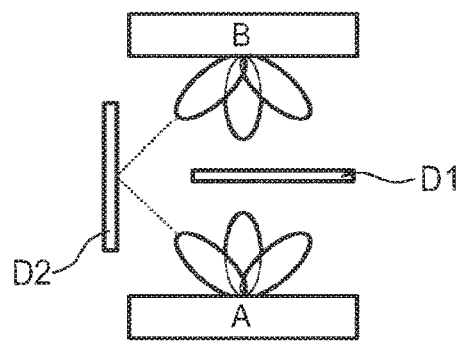

FIG. 2 shows two scenarios with optimal beam selection for data communications. In the situation shown in FIG. 2A, the line-of-sight (LOS) exists and the best sectors are aligned to the LOS path. In the situation shown in FIG. 2B, an obstacle O1 between device A and B attenuates the LOS path and a further obstacle O2 acts as a reflector. Given that the attenuation of the LOS component is stronger than the reflection loss, the best sectors are chosen such that both align towards the reflecting obstacle O2 yielding maximum SNR or received power. Thus, the weak LOS path due to partial blocking as shown in FIG. 2B leads to data communication via the reflector O2.

From a positioning point of view, the scenario shown in FIG. 2A will provide correct information on ToF and sector angle, whereas the scenario shown in FIG. 2B will provide incorrect information. Consequently, the ToF is estimated too long, i.e. the distance between both communication devices A and B is estimated too large and the sector angle is wrong as well, as communication device B is expected to be above and on the left with respect to communication device A although it resides directly above. Thus, beam alignment for communication is not suitable for positioning.

The channel conditions in the scenario shown in FIG. 2B are often referred to as a near NLOS (n-NLOS) condition, where the channel consists of a weak LOS and strong NLOS components. Power of the LOS part is still assumed to be greater than zero; otherwise the channel would be considered as NLOS. Further, the sectors are formed by very directive antenna characteristics and strongly suppress impulse response information which is not aligned to the main direction of the sector. Therefore, it is impossible or very complicated to reconstruct the LOS component out of baseband data generated by sectors favoring any NLOS part of the channel.

Figure 3:
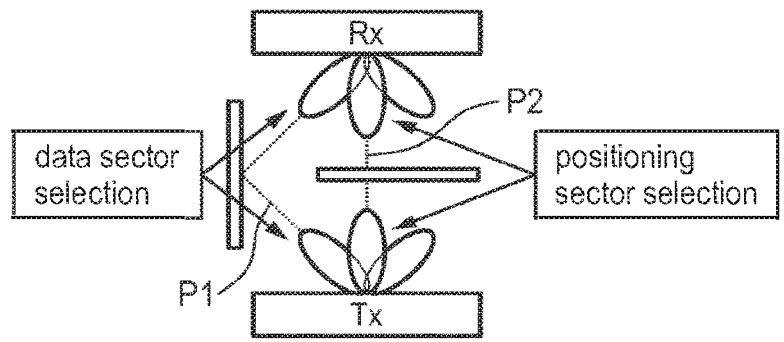
FIG. 3 shows a diagram illustrating the difference between beamforming maximizing channel capacity and beamforming for LOS detection according to the present disclosure.

The present disclosure makes use of beamforming for positioning applications in a wide sense, i.e. the disclosed methods and devices are not limited to 60 GHz systems only, but may also be applied with regular multi-antenna communication schemes, where beamforming is not necessarily required for data communications. FIG. 3 shows a diagram illustrating the difference between beamforming maximizing channel capacity and beamforming for LOS detection according to the present disclosure. Briefly summarized, as shown in FIG. 3, the NLOS path P1 may be used for (regular) communication, i.e. data sector selection, and the LOS path P2 may be used for positioning, i.e. positioning sector selection.

Figure 4:
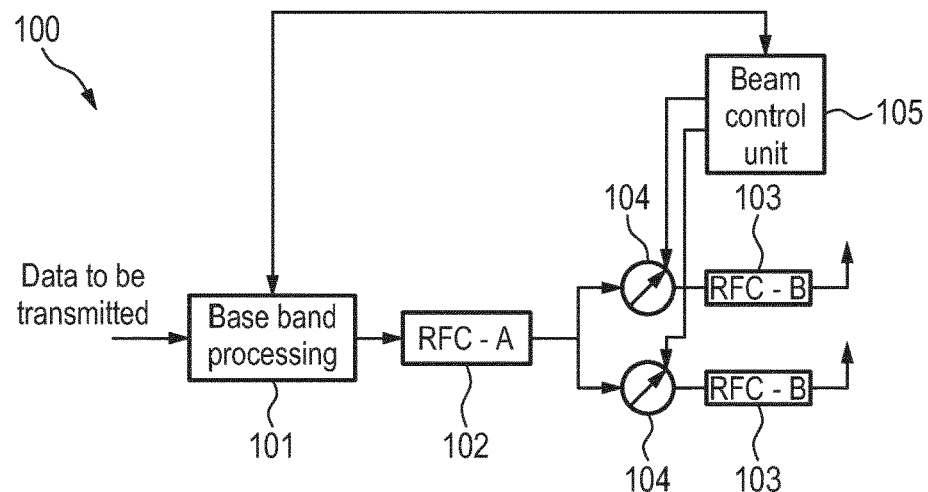
FIG. 4 shows a schematic diagram of an embodiment of an analog beamforming arrangement as it is typically applied in mm-wave systems.
Figure 5:
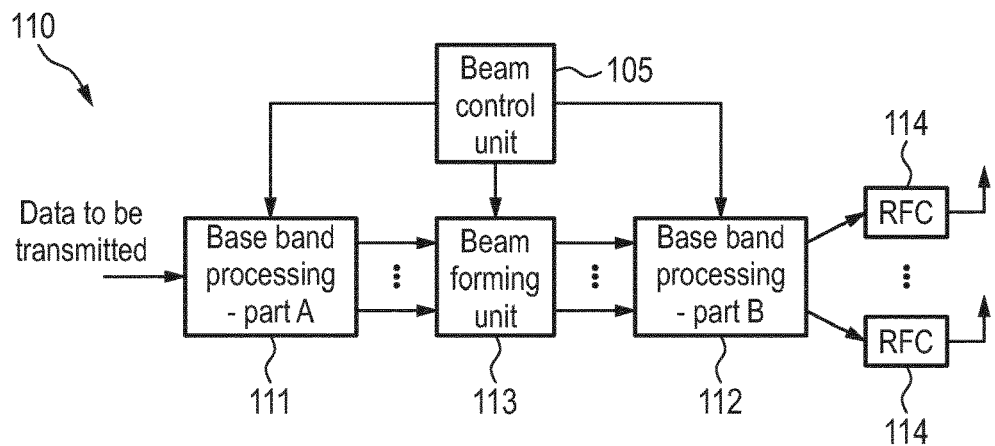
FIG. 5 shows a schematic diagram of an embodiment of a digital beamforming arrangement as typically applied in MIMO communication systems operating well below 60 GHz.

In general, the following embodiments of beamforming architectures shown in FIGS. 4 and 5 may be applied for beamforming in the context of the present disclosure. FIG. 4 shows a typical mm-wave transmitter architecture 100, where beamforming is performed in analog domain. Input data is processed in baseband processing unit 101 (e.g. including an encoder, a modulator, etc.) and allocated to an RF chain (RFC). The RFC is divided in part A (RFC-A 102), which holds DAC, filtering, and frequency up-converter, and part B (RFC-B 103), which holds a power amplifier, respectively. The number of RFC-A elements 102 corresponds to the number of antenna arrays (one in FIG. 4). A controllable phase shifter 104 is located between RFC-A 102 and each RFC-B 103. The phase shifters 104 are controlled by a beam control unit 105 such that directive beams can be formed by the antenna array(s). The number of phase shifters 104 and RFC-B elements 103 corresponds to the number of antenna elements in the associated antenna array.

In contrast, FIG. 5 shows a regular multi-antenna transmitter architecture 110, where digital beamforming is performed. Two baseband processing units 111, 112 are provided, one before and one after the beamforming unit 113. Each transmit antenna features a full RFC 114. Beamforming is performed in digital domain and is done such that an ensemble of transmit antennas can form directive beams.

The receivers have a similar setup as the transmitters but perform inverse operations. Beamforming at the receiver side is done in a similar way as at the transmitter so that several receive beams can be selected. To summarize, different beamforming architectures can generate several directive beams or sectors at transmitter side and/or receiver side, which can be controlled.

Figure 6A:
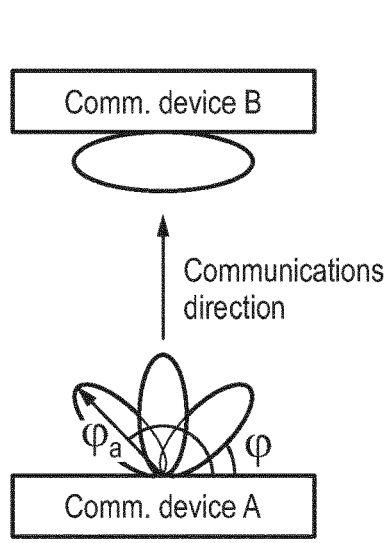
FIG. 6 shows diagrams illustrating angular definitions for LOS detection and device orientation estimation.

One embodiment of this disclosure concerns a dedicated beam selection algorithm for positioning. Instead of selecting the sector which maximizes received power, the sector may be selected which minimizes time of arrival (ToA). For outlining the concept, the simplified (and non-limiting)

scenario shown in FIG. 6A is considered, in which communication device A can form several directive beams, whereas communication device B has a (quasi) omni-directional pattern symbolized by the flat ellipsoid. This setup is often referred to as directional-to-omni (D2O), whereas the setup of FIG. 2 shows a directional-to-directional (D2D) setup. Extension from D2O to D2D is straightforward and will be addressed later.

In the following, it is assumed that device A is in transmit mode, whereas device B is in receiving mode. A 2D omni-directional channel model between both devices is given by the complex-valued multi-dimensional function $H(\varphi, n)$. Thereby, $\varphi$ denotes the angle of departure (AoD) at device A and n denotes discrete time. During a training phase, the transmitter sweeps through all or a subset of sectors while the receiver is listening (quasi) omni-directional. The receiver is able to estimate the impulse response which is achieved for a certain sector. Directive transmission can be considered as spatial filtering of $H(\varphi, n)$ with respect to $\varphi$. Each transmit sector a can be represented by a function $T_a$ which filters $H(\varphi, n)$ to get the impulse response $h_a(n)$ seen or measured by the receiver $$h_a(n) = T_a(H(\varphi, n))$$

Thereby, $T_a$ typically enhances spatial components in the main direction of sector a characterized by the AoD $\varphi_a$ whereas it attenuates components outside the main direction.

This concept can be generalized to a 3D environment supporting D2D. In this case, $H(\varphi_T, \theta_T, \varphi_R, \theta_R, n)$ is a function of angles $\alpha_T, \theta_T$ which are azimuth and elevation AoD at the transmitter side and angles $\varphi_R, \theta_R$ which define the angle of arrival (AoA) at the receiver side. Spatial filtering by means of transmit beamforming is done by $T_a$ which filters with respect to $\varphi_T, \theta_T$ towards main transmit direction $(\varphi_a, \theta_a)$ of sector a. In contrast, receiver beamforming is performed by $R_b$ which filters with respect to $\varphi_R, \theta_R$ towards main receive direction $(\varphi_b, \theta_b)$ of sector b. The impulse response between device A and B considering transmit and receive beamforming is given by $$h_{a,b} = R_b(T_a(H(\varphi_T, \theta_T, \varphi_R, \theta_R, n)))$$

The notation above is very general and also covers a D2O and even an O2O scenario. In D2O, the receive antenna has an (quasi) omni-directional pattern and $R_b$ considers all spatial components in direction $\varphi_R, \theta_R$ (quasi) equally, whereas in O2O, $T_a$ and $R_b$ consider all spatial components in $\varphi_T, \theta_T, \varphi_R, \theta_R$ (quasi) equally. Also note that conventional sub 60 GHz communication systems typically implement the O2O scenario. Obviously, a measured impulse response holds much more NLOS components in this case compared to a D2O or D2D scenario.

In the following, the complex valued impulse response $h_s(n)$ is considered with n=0 . . . N−1 being discrete time, integer s∈S unifies sector labels (a, b). The mapping from sector labels (a, b) to s is bijective and reversible. Impulse response length N depends on implementation and channel estimation sequences.

An embodiment of the positioning beam selection algorithm considers $h_s(n_0)$ for all or a subset of sectors s. Index $n_0$ denotes the first sample of the impulse response. How $n_0$ is determined depends on implementation and is a function of channel estimation sequence parameters and noise power. Thresholding for example can provide this information by $$n_0 = \min_s\{\min_n[\arg(|h_s(n)| \geq h_s^{thr})]\}$$

with $h_s^{thr} > 0$ being a detection threshold depending on noise and/or training sequence parameters. A simple but effective threshold can be $h_s^{thr} = \max_n |h_s(n)|$ which is equivalent to considering the maximum of $|h_s(n)|$. This selection is effective because the sectors perform spatial filtering, i.e. sectors s have directive characteristics which amplify multipath components coming from angles equal or close to main direction and suppress components from outside main direction. For conventional transmitter architectures, which implement O2O, this threshold selection has poor performance, because the weak LOS path is not detected since its magnitude is typically well below the maximum of $|h_s(n)|$ in n-NLOS. Thus, the directivity of the antenna sectors is gainfully used for positioning.

Determination of $n_0$ requires timing synchronization between transmitter and receiver. This synchronization is required to be stable during the entire impulse response estimation process, i.e. timing synchronization must be either equal or appropriately corrected for all $h_s(n)$. Given that impulse responses are successively estimated in a frame structure, the time base of each $h_s(n)$ has to be seen in reference to the first or previous received sector.

An adequate positioning sector $s_0^P$ is given by that sector which achieves highest magnitude at index $n_0$, i.e. $s_0^P = \arg\max_{s \in S} |(n_0)|$. In contrast, beam selection for communications is typically done by $s_0^C = \max_{s \in S} \Sigma_{n=0}^{N-1} |h_s(n)|^2$. The related ToA value is deduced by $t_0 = n_0 T_S - \epsilon$ with $$T_S = \frac{1}{f_S}$$

being the sampling interval and E being implementation dependent processing delay. Further, the corresponding angles given by sector $s_0^P$ are defined as follows $\varphi_a, \varphi_b, \theta_a, \theta_b = \arg(s_0^P)$. For some applications, ToA accuracy may be crucial and the quantization of $t_0$ to multiples of $T_S$ may not be sufficient. In this case super-resolution algorithms (e.g. MUSIC as described in X. Li and K. Pahlavan, "Super-Resolution TOA Estimation With Diversity for Indoor Geolocation," *IEEE Transactions on Wireless Communications*, vol. 3, no. 1, pp. 224-234, 2004) are applicable. Thereby, the first arrival path deduced by MUSIC shall be considered for each $h_s(n)$. Minimization of the first arrival path with respect to all or a subset of sectors s yields $n_0$. In contrast to the method above, $n_0$ can now be a rational number and the equations from above change as follows $$n_0 = \min_s\{\min_n[\text{MUSIC}(h_s(n))]\}$$

$$s_0^P = \arg n_0$$

The MUSIC operator in the equation above retrieves from each impulse response the non-integer spaced impulse response taps.

In a real system, it is desirable to first perform beamforming for bidirectional communications, i.e. best communication or data sectors for device A transmitting to device B are determined. As a second step, beamforming for positioning is performed which is only applied for channel sounding, and/or for positioning-related data communications. Regular data transfer is still performed by using the best sectors for communications or data exchange. Thus, the extent of the sector search for positioning is flexible and in general independent of the communication or data sector search.

The following search spaces or beam setups are reasonable: (a) D2O, according to which communication device A or B applies a directive pattern, whereas communication device B or A features a (quasi) omni-directional receive characteristic; and (b) D2D, according to which both communication device A and B apply directive patterns for transmitting and receiving data, respectively.

The options are sorted by complexity or training overhead in an increasing order. However, option (a) results in a worse performance compared to option (b) because spatial filtering is stronger in case (b) since two directive patterns $T_a$ and $R_b$ are applied to H. Since option (a) considers a (quasi) omni-directional receive or transmit pattern, this yields less attenuation of the NLOS components of the channel outside the main direction. This holds for both ToA and angular information.

Figure 6B:
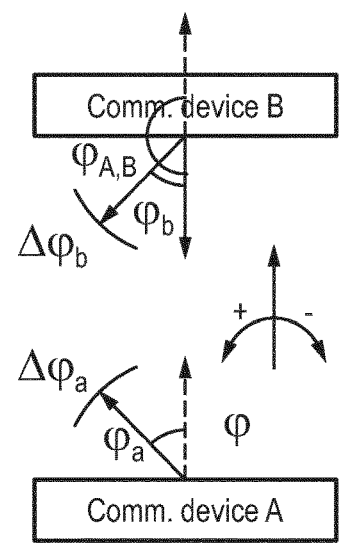

Furthermore, angular information $\varphi_a$, $\theta_a$ is available in case (a) and (b), whereas $\varphi_b$, $\theta_b$ is only available in case (b) or in bidirectional D2O in case of a reciprocal channel (see later). In fact, $\varphi_a$, $\theta_a$ are sufficient for positioning as shown in FIG. 1, but $\varphi_b$, $\theta_b$ can be used for detection of a NLOS scenario. FIG. 6B shows the basic method in 2D. In order to evaluate the angular information of device A and B, the orientation of the antenna array of communication device B relative to device A $\varphi_{A,B}$ is required, as will be explained in more detail below for a hybrid application. The raw angular information $\varphi_b$ is corrected by the antenna orientation and compared in a second step. If a LOS path is present the following equation holds $$\varphi_a - \varphi_b - \varphi_{A,B} = \pm \pi$$

The same equality holds in a 3D scenario for the $\theta$ angles as well. However, a small angular spread of the applied beams cannot be avoided in real system implementations. The angular spread may be quantified by a maximum angular error which indicates the angular distance centered on the main direction. In order to improve position estimation and/or LOS detection, this information can be used and the equality from above changes as follows $$\varphi_a - \varphi_b - \varphi_{A,B} = \pm \pi - \epsilon \frac{\Delta \varphi_a}{2} + \delta \frac{\Delta \varphi_b}{2}$$

A LOS path is detected if the equation is fulfilled for any $\epsilon, \delta \in [-1,1]$ with $\Delta\varphi_a$ and $\Delta\varphi_b$ the maximum angular error of sectors a and b, respectively. The same equality holds in a 3D scenario for the $\theta$ angles as well. Hence, an evaluation method is provided, which combines angular information from initiator and responder in order to either doing orientation estimation of one communication device or doing LOS verification.

In practical scenarios, the relative orientation $\varphi_{A,B}$ may be difficult to obtain. Therefore, several applications of the equation above can be implemented: (i) $\varphi_{A,B}$ known, NLOS/LOS situation unknown: If a LOS is present, the equality is fulfilled; and (ii) $\varphi_{A,B}$ unknown, LOS condition known or assumed: $\varphi_{A,B}$ can be obtained.

Also hybrid applications are feasible. Thereby, option (i) and (ii) can be applied successively by incorporating measurements at different time instants and/or of several antenna arrays, and/or at different frequencies, and/or different antenna direction, and/or orthogonal sequences.

Figure 6C:
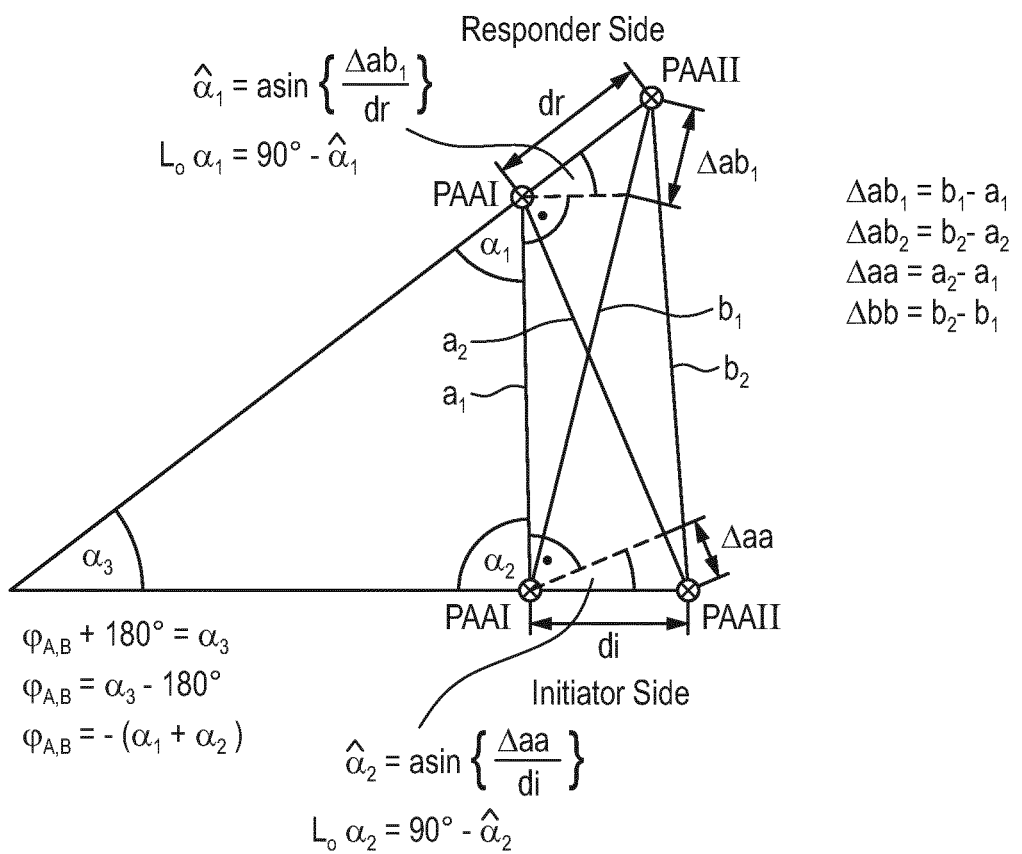

Assuming a hybrid application with at least two RF chains at both sides, the difference in TOA between paths from one transmitter to each receiver antenna can be measured quite accurately. This can be done for example by pairwise correlating all received signals to obtain the time difference in number of samples, which can be translated to a time difference in a unit of time. One pair of correlated signals per device (i.e. one pair on the initiator side and one pair on the responder side) may be sufficient to compute the orientation. Under the condition that this measurement is done on both sides (initiator and responder) and that the geometrical antenna positions are known to the control unit, the angular orientation of both devices relative to each other, i.e., $\varphi_{A,B}$, can be calculated. This is illustrated in FIG. 6C.

A further approach to differentiate between LOS and NLOS consists in the evaluation of the applied sectors for data transmission and positioning estimation, $s_0^C$ and $s_0^P$, respectively. Both are likely equal in a LOS scenario.

Figure 7:
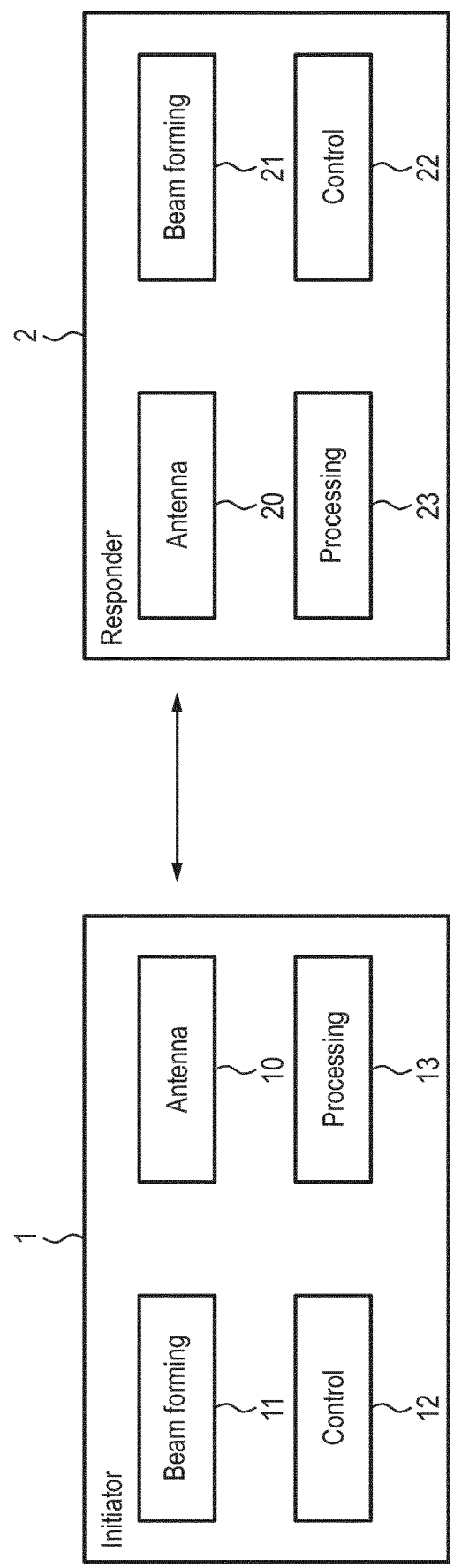
FIG. 7 shows a schematic diagram of a first embodiment of an initiator communication device and a responder communication device.

FIG. 7 shows a schematic diagram of a first embodiment of an initiator communication device 1 and a responder communication device 2 according to the present disclosure. The initiator communication device 1 for RF-based communication and acquisition of information for use in position determination comprises an antenna unit 10 configured to transmit and receive RF signals, e.g. an antenna unit having one or more antennas such as a phased array antenna (which can do beamforming). A beamforming unit 11 is provided to perform beamforming and to control the antenna unit to transmit and/or receive RF signals using one or more selected beams. A control unit 12 controls the beamforming unit 11 in a training phase to perform beamforming for determining an initiator LOS beam to the responder communication device 2, i.e. enabling to determine the initiator LOS beam itself (its complete configuration) or any information related to the initiator LOS beam, such as the initiator angular information. In other words, "for determining the initiator LOS beam" shall be understood as "determining the initiator LOS beam configuration and/or information related to the initiator LOS beam, such as the initiator angular information". A processing unit 13 determines the initiator LOS beam and determines initiator angular information of the initiator LOS beam.

The responder communication device 2 comprises an antenna unit 20 configured to transmit and receive RF signals. A beamforming unit 21 is provided to perform beamforming and to control the antenna unit to transmit and/or receive RF signals using one or more selected beams. A control unit 22 controls the beamforming unit 21 in a training phase to perform beamforming for determining a responder LOS beam to the initiator communication device 1. A processing unit 23 determines the responder LOS beam and determines responder angular information of the responder LOS beam.

In an embodiment for actually determining the position of the initiator communication device 1 the control unit 12 may further be configured to control the beamforming unit 11 and the antenna unit 10 in a measurement phase to exchange RF signals with the responder communication device 2 via a communication channel using the determined initiator LOS beam and the processing unit 13 may further be configured to determine the time of flight of RF signals exchanged with the responder communication device in a measurement phase and to determine the position of the communication device from the determined time of flight and/or the initiator angular information of the initiator LOS beam. Further, in this case the control unit 22 may further be configured to control the beamforming unit 21 and the antenna unit 20 in a measurement phase to exchange RF signals with the initiator communication device 1 via a communication channel using the determined responder LOS beam and the processing unit 23 may further be configured to determine the time of flight of RF signals exchanged with the initiator communication device in the measurement phase. The control unit 22 further controls the antenna unit 20 to transmit the responder angular information and/or the determined time of flight to the initiator communication device 1 or an external entity for determining the position of the initiator communication device from the determined time of flight and/or the responder angular information of the initiator LOS beam.

Figure 8:
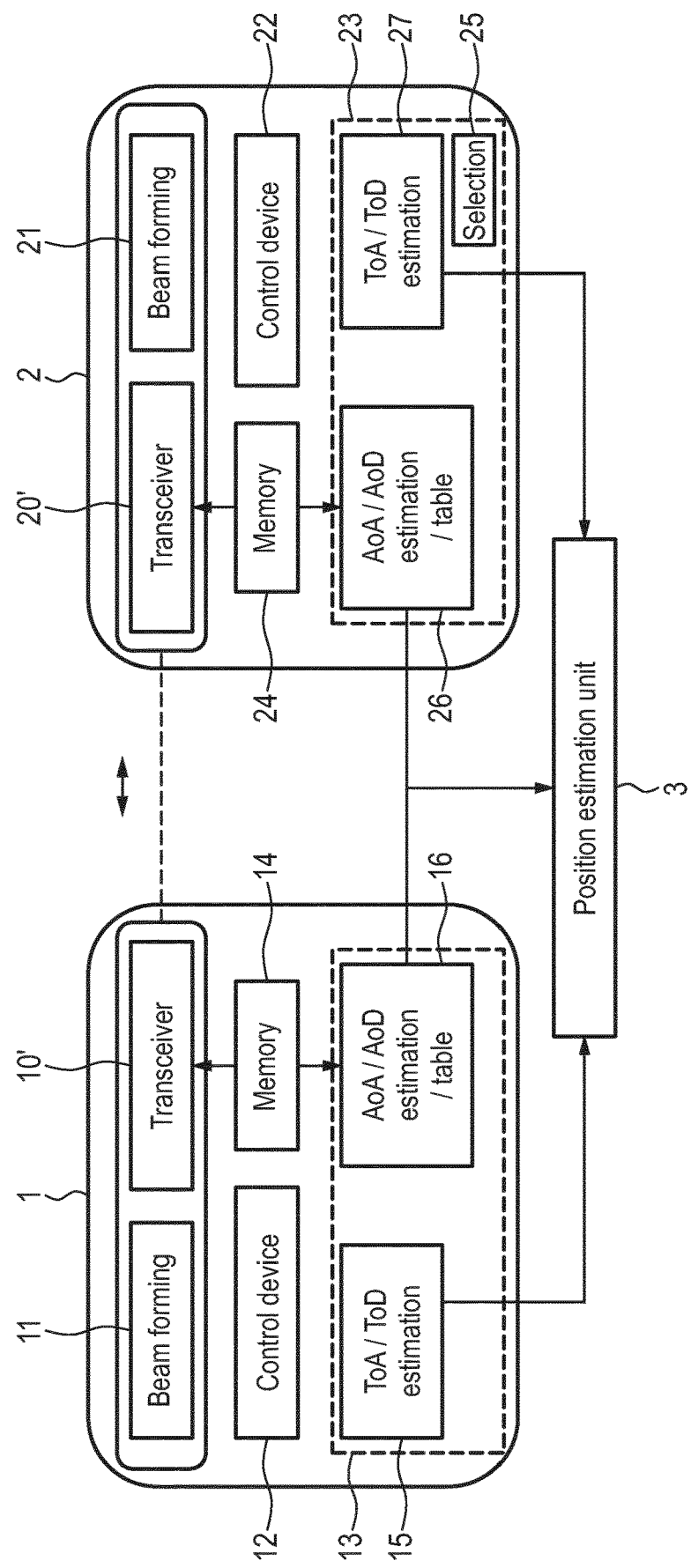
FIG. 8 shows a schematic diagram of a second embodiment of an initiator communication device and a responder communication device.

FIG. 8 shows a schematic diagram of a second embodiment of an initiator communication device 1 and a responder communication device 2 according to the present disclosure. In this embodiment a selection unit 25 makes selection of the sector (i.e. antenna beam) to be used by the beamforming unit 21 in the measurement phase based on a ToA/ToF estimation performed by ToA/ToF estimation unit 27. The control units 12, 22 manage data exchange and frames. A memory 14, 24 in one or both devices 1, 2 stores the best beam sector for (subsequent) positioning in the measurement phase, i.e. in the measurement phase the information stored in the memories 14, 24 is used by the control units 12, 22 to configure the beamforming units 11, 21 and the transceiver units 10', 20' (including the antennas 10, 20). An AoA/AoD estimation unit 15, 25 (or an AoA/AoD table) is used to determine the AoA/AoD based on beamforming data taken from the respective memory 14, 24.

In this embodiment, an external position estimation unit 3 is provided to process the timing and/or angular information to determine the position of the initiator communication device 1, i.e. this function of processing unit 13 is taken over by an external entity in this embodiment (but could alternatively also be performed by the processing unit 13 or 23, which could include such a position estimation unit). In FTM, for instance, the position estimation unit is centered at the FTM initiator.

Figure 9:
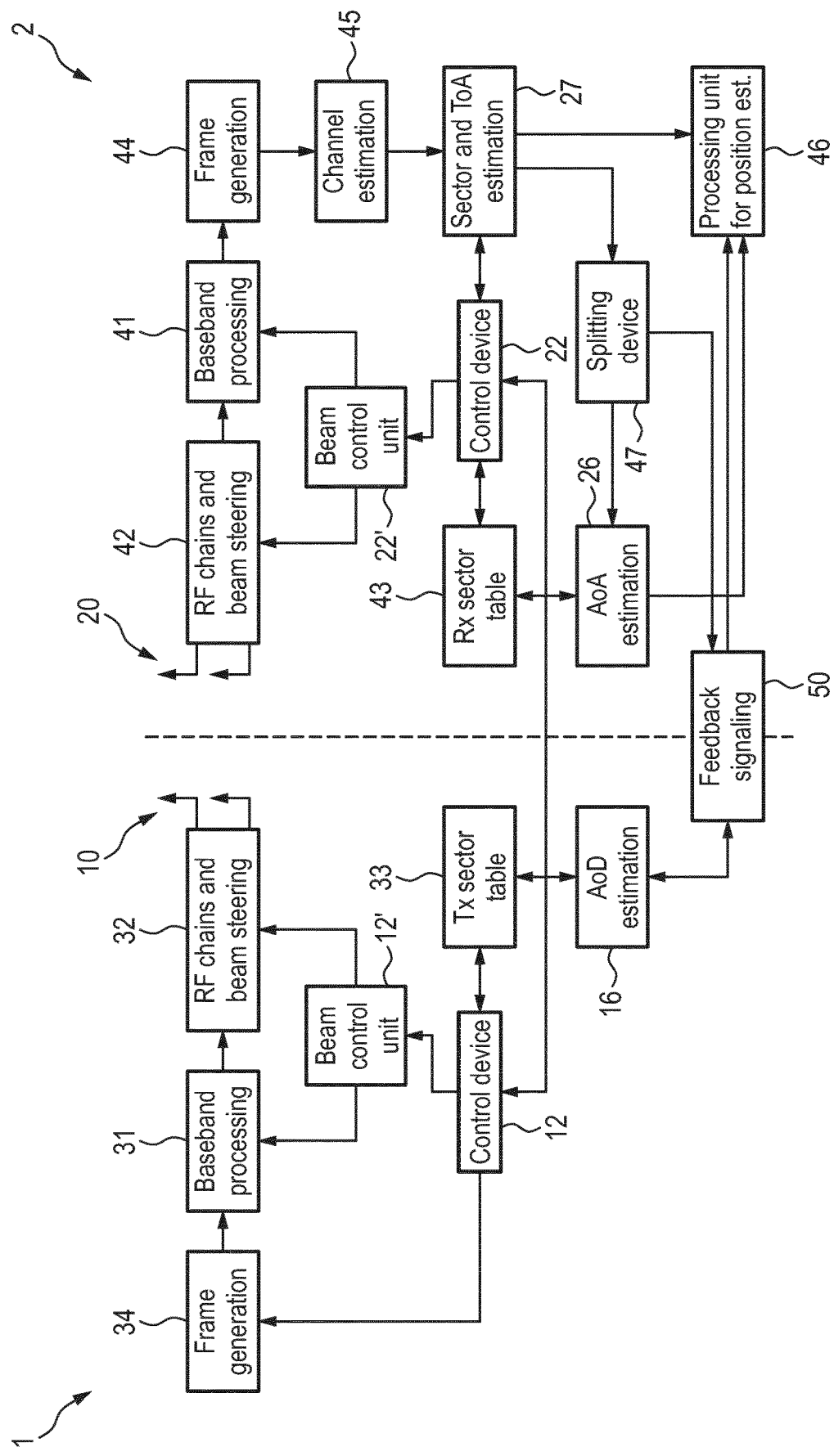
FIG. 9 shows a schematic diagram of a third embodiment of an initiator communication device and a responder communication device.

FIG. 9 shows a schematic diagram of another embodiment of a system including an initiator communication device 1 and a responder communication device 2 according to the present disclosure. It shows transmitter 1 (i.e. initiator communication device) and receiver 2 (i.e. responder) communication device) with beamforming capabilities (at least one device is required to employ several different sectors). Both transmitter 1 and receiver 2 comprise a control unit 12, 22 providing sector selection to the beam control unit 12', 22', which controls the beamforming entities including baseband processing units 31, 41 and RF chain and beam steering units 32, 42, such that the desired beams are formed. Sector information is also stored in a table 33, 43. There is also an angular estimation unit 16, 26 (also called AoA/AoD estimation unit), which can deduce AoD (in the transmitter 1) or AoA (in the receiver 2) from sector information. These angular estimation units 16, 26 are provided since different devices may have different interpretations of antenna sectors. This information is, however, known at the respective device, which employs the particular sector.

At the transmitter side the control unit 12 further controls a frame generation unit 34, which generates estimation frames (e.g. sector sweep frames), which are transmitted with a certain antenna sector. In contrast, the receiver 2 comprises a frame evaluation unit 44 connected to a channel estimation unit 45, which determines channel state information such as impulse response. The control units 12, 22 on the transmitter and receiver side are preferably synchronized (preferably over the air) and perform training of several sectors a and b. The sector and ToA estimation unit 27 on the receiver side selects thereof the best sector and its ToA is directly passed to a processing unit 46 for position estimation, whereas sector information is split in transmitter and receiver sector information in a splitting unit 47. The receiver sector information is directly processed by the AoA estimation unit 26, while transmit sector information is transferred via signaling 50 to the transmitter 1, where the AoD is determined and fed back via signalling 50 to the receiver 2 for position estimation in the processing unit 46.

According to another embodiment, the position estimation can be centralized at the transmitter side (as shown in FIG. 7) or as an external processing that is performed centrally, e.g. in a server, in the cloud, in an base station, etc. In case the position estimation is provided at the transmitter side, AoA, ToA, and transmit sector information is transferred from the receiver to the transmitter via signaling. In other embodiments, multiple antenna arrays may be available. In this case, the basic principle stays unchanged. However, the sectors are now defined for each antenna separately. The Tx-Rx antenna array combination having the lowest ToA shall be considered as an output for positioning sounding. AoD and AoA are referred to those Tx and Rx antenna arrays.

The following protocol description gives an implementation example of how the disclosed method and apparatus may be applied in a system in accordance with IEEE 802.11ad or 802.11ay or 802.11az. In a WLAN system according to IEEE 802.11, positioning can be performed by employing Fine Time Measurement (FTM) protocol, which measures the round trip time (RTT) between two STAs. Dividing RTT by two yields the ToF.

Figure 10:
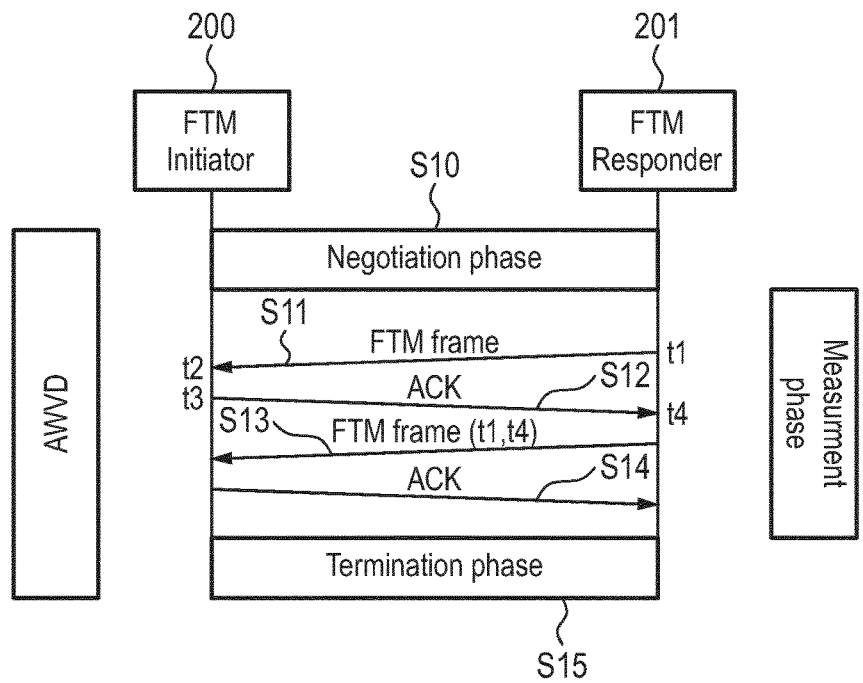
FIG. 10 shows a diagram illustrating a conventional fine time measurement procedure.

FIG. 10 shows a flowchart illustrating the basic FTM procedure with one elementary measurement event. The FTM initiator 200 initiates a FTM session with the FTM responder 201 during the negotiation phase S10. Subsequently, the measurement phase takes place, where a FTM frame is transmitted in step S11 from the FTM responder 201 to the FTM initiator 200. Time of departure (ToD) t1 as well as ToA t2 are determined. Subsequently, the FTM initiator 200 responds with an ACK in step S12, which has ToD t3 and ToA t4. The FTM responder 201 returns values t1 and t4 to the FTM initiator 200 in step S13, which acknowledges reception with an ACK in step S14. The FTM initiator 200 is now able to determine ToF by $$ToF = \frac{RTT}{2} = \frac{t_4 - t_1 - (t_3 - t_2)}{2}$$

The FTM session is terminated afterwards by a further message exchange S15.

In FTM same sectors are used for the entire FTM session. The actual antenna sectors for both FTM initiator and FTM responder are defined by the antenna weight vector (AWV). The AWV for data communications is indicated by AWVD.

Figure 11:
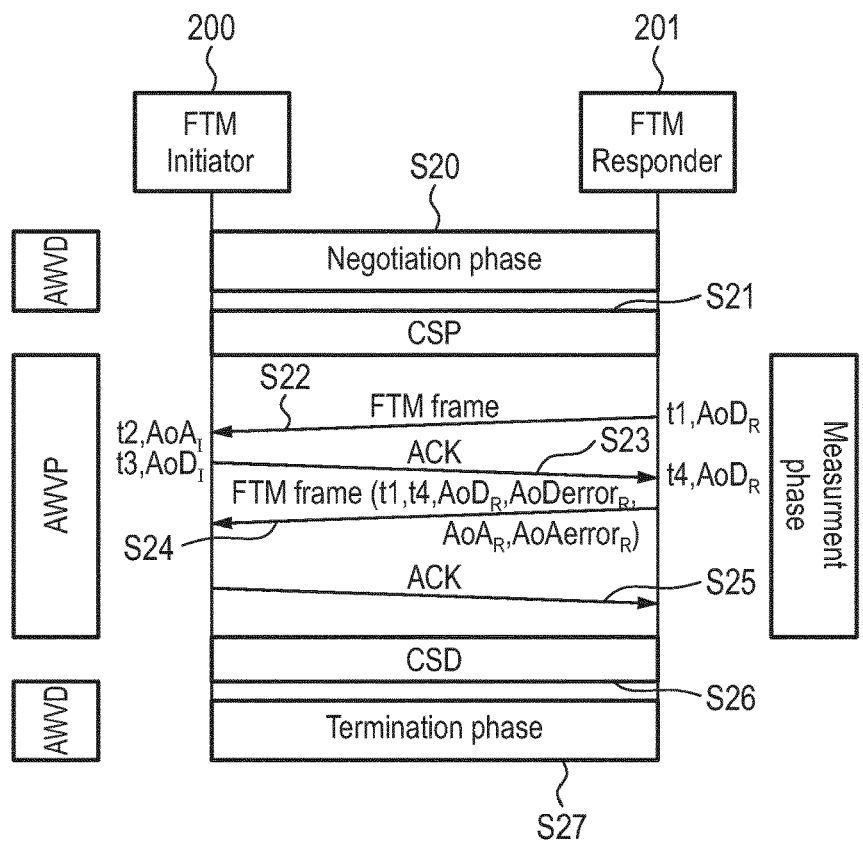
FIG. 11 shows a diagram illustrating a first embodiment of a fine time measurement procedure according to the present disclosure.

According to the present disclosure, a different AWV is used for the measurement phase as indicated in FIG. 11 showing a flowchart of an embodiment of an FTM procedure that may be used in the context of the present disclosure. In the following, AWVP denotes the AWV for positioning, which is derived by minimizing ToA between FTM initiator 200 and FTM responder 201. The FTM negotiation phase S20 is performed using AWVD for FTM initiator 200 and FTM responder 201. Subsequently, channel sounding for positioning (CSP) takes place in step S21, which determines AWVP for FTM initiator 200 and FTM responder 201. The AWVP are applied during the entire measurement phase. Subsequent to the measurement phase, a further channel sounding for data communications (CSD) step S26 is optionally performed and the AVWD are used to communicate the following messages until the FTM session is terminated in step S27. In case CSD step S26 is omitted at this stage, the AVWD from previous CSD step S21 is applied. In a stationary scenario, where FTM initiator 200 and responder 201 move slowly, CSP and CSD can be performed occasionally. In this case, AWVP and AWVD from the previously determined CSP and CSD are applied, respectively.

In order to use $AoD_R$ and/or $AoA_R$ information from the FTM responder (index R indicates FTM responder), the FTM frame holding t1 and t4 may have additionally an angular field which holds the $AoD_R$ and/or $AoA_R$ of the previous FTM frame and/or an angular error element which holds the maximum angular error ($AoDerror_R$ and/or $AoA_R$-error) for the used sector(s). The maximum AoD or AoA error should be centered to the main direction. The FTM initiator is aware of its own $AOA_I$ and $AoD_I$ (index I refers to FTM initiator). Thus, no signaling is required.

Since AWVP typically achieves less performance for data communications than the AWVD in terms of bit error rate (BER), it is desired that messages sent by AWVP use a modulation coding scheme (MCS) with low throughput, such as DMG control mode (as e.g. described in IEEE Computer Society, Part 11: Wireless LAN Medium Access Control (MAC) and Physical Layer (PHY) Specifications Amendment 3: Enhancements for Very High Throughput in the 60 GHz Band, New York: IEEE, 2012), which is however more robust against noise.

Figure 12:
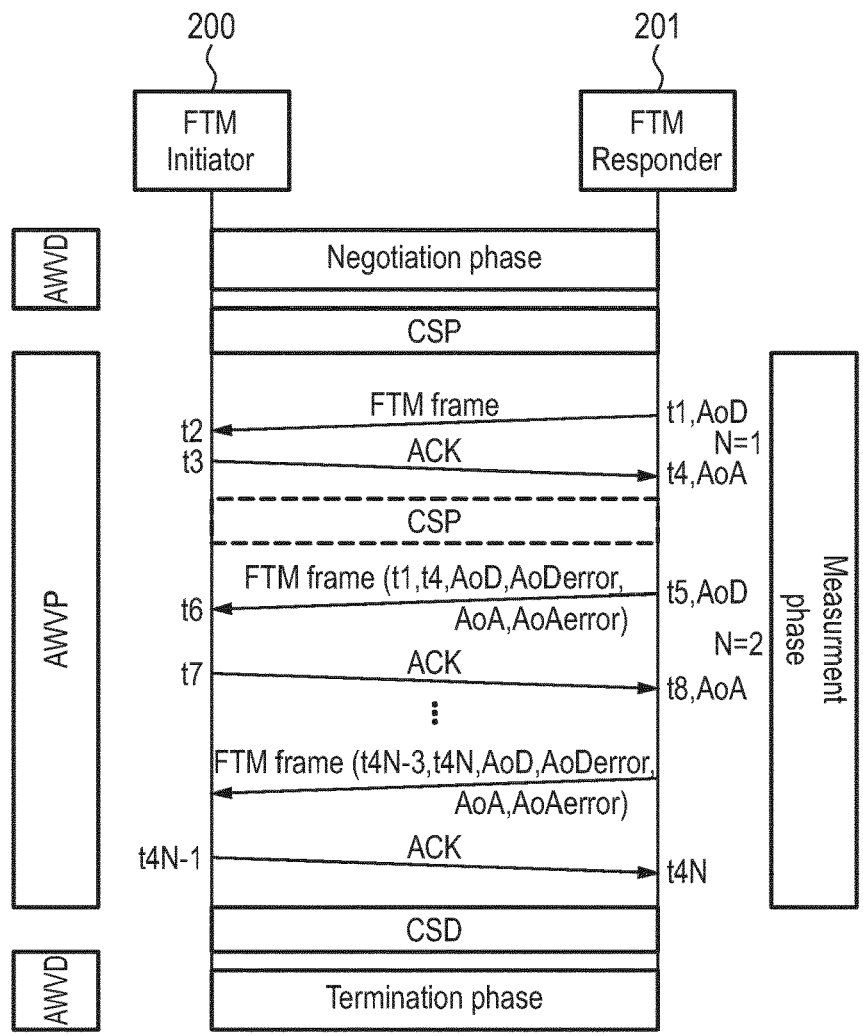
FIG. 12 shows a diagram illustrating a second embodiment of a fine time measurement procedure according to the present disclosure.

Another embodiment of the FTM protocol supports multiple successive measurements in order to enhance positioning performance. FIG. 12 shows a flowchart of such an embodiment of an FTM procedure that may be used in the context of the present disclosure. The following aspects are important: Depending on STA mobility, a CSP can optionally be performed between each elementary measurement. In this case, every FTM frame shall hold the $AoD_R$ and/or $AoA_R$ and $AoD_R$ and/or $AoA_R$ error subfield of the previous measurement. Further, if CSP is done only once, it is sufficient to include $AoD_R$ and/or $AoA_R$ and $AoD_R$ and/or $AoA_R$ error element only once, preferably for N=1 so that this information is available to the FTM initiator at a very early stage.

The procedure shown in FIG. 12 covers the most general scenario, i.e. D2D where sectors between downlink and uplink can be even different. In case an omni-directional pattern is applied, the respective angular field holds an arbitrary value and the respective angular error field holds a value of $2\pi$ or 360° for φ and π or 180° for θ.

Given that a FTM initiator 200 is only interested in positioning and data transfer is not required, the entire FTM protocol may run with AWVP only. This can be beneficial in case a station (STA) does not associate with an access point (AP) (unassociated mode) and data transfer is not possible and/or not required.

The modified FTM protocols shown in FIGS. 11 and 12 enable the FTM initiator 200 to determine TOF and to have knowledge of the FTM responder's AoD and AoA. Furthermore, the FTM initiator 200 is aware of its own AoD and AoA. Depending on the desired positioning mode, the FTM initiator 200 requires further but static information of the FTM responder 201. FTM initiator 200 and responder 201 shall operate with the same coordinate system. For relative positioning of the FTM initiator 200 with respect to the FTM responder 201, the orientation of FTM responder antenna array is required, i.e. the reference to where all AoD/AoA angles are referred to. For absolute positioning of the FTM initiator 200, the orientation and absolute position of FTM responder 201 (e.g. longitude, latitude, altitude) is required.

Figure 13:
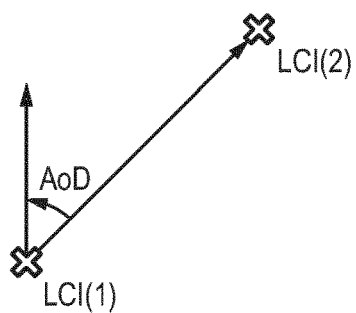
FIG. 13 shows a diagram illustrating a method to define device orientation in WLAN systems.

Since orientation and position of the FTM responder 201 are static (in case of a stationary FTM responder), this information can be transmitted infrequently and/or on request. In FTM this may be achieved with the "Location configuration information (LCI) report" which holds the absolute position of the FTM responder 201. For this purpose an orientation indication may be used by applying a further LCI field which defines a second point. The first and second points define start and end point of a vector which indicates the orientation of the FTM responder 201, where the AoD, AoA information is referred to. This is illustrated in the diagram shown in FIG. 13. The single LCI is already implemented in the IEEE802.11 specification. It gives the absolute position of a device. The idea is to have a second LCI defining—together with the first LCI—a vector which indicates orientation (of the device).

The CSP and CSD procedure depend on the communication system which is employed for positioning estimation.

According to IEEE 802.11ad, beamforming is done via sector level sweep (SLS) and (optionally) via a beam refinement phase (BRP). The SLS performs a bidirectional D2O training, whereas BRP achieves a bidirectional D2D training. Given that the channel is reciprocal, i.e. the channel is invariant with respect to the communications direction, the best sectors retrieved in SLS can be applied to achieve a bidirectional D2D link.

Figure 14:
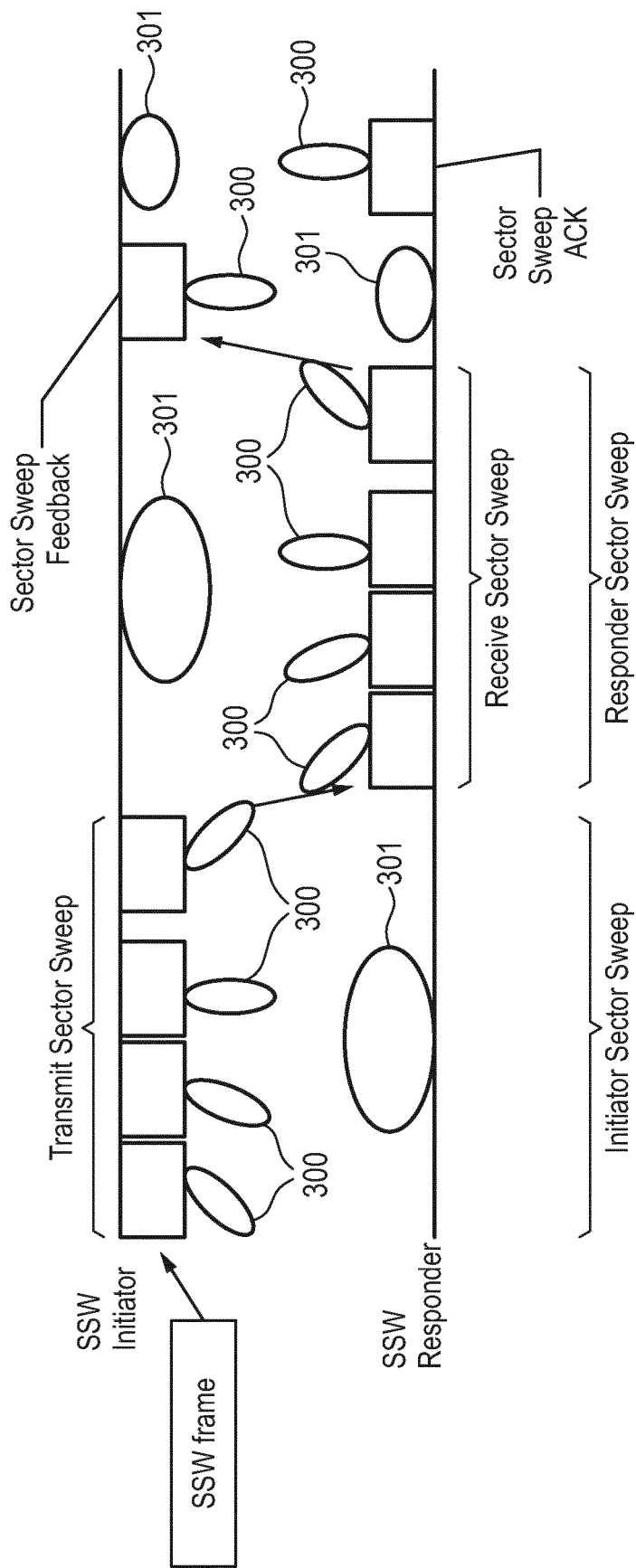
FIG. 14 shows a diagram illustrating the training phase of a method according to the present disclosure.

FIG. 14 shows a diagram depicting an SLS phase that may be applied in the training phase according to the present disclosure. The applied antenna beam pattern in each phase is indicated by narrow and wide beams for directional and omni-directional characteristic, respectively. The narrow patterns 300 indicate transmission and the wide patterns 301 indicate reception. In FIGS. 9 and 12, the sector sweep (SSW) initiator is the FTM responder and the SSW responder is the FTM initiator, but it can in principle be handled vice versa as well. The SLS phase as well as the BRP phase can be extended to support not only the best sector for data communications but also the best sector for positioning.

In particular, in one aspect the present disclosure proposes an extension of the SLS phase, to support determination of ToAs. Furthermore for the proposed SLS for positioning, feedback and acknowledgement frames contain the best sectors for positioning e.g., having the smallest ToAs, as opposed to the frames currently defined SLS, where the sectors with the strongest channels are signaled. This first training phase may be followed by a further refinement phase, which is proposed to be an extension of the BRP phase. The extension is in the sense that the initiator and responder ask for refinement of the best beam candidates, in point of positioning information.

The following frames may be part of SLS: SSW, SSW-feedback (SSW-FBK), and SSW acknowledge (SSW-ACK). All those frames hold a SSW feedback field (unequal SSW-FBK frame) shown in FIG. 15. FIG. 15A shows a SSW feedback field format when transmitted as part of an ISS and FIG. 15B shows a SSW feedback field format when not transmitted as part of an ISS.

The following two modes of signaling may be applied according to the present disclosure: Positioning sector selection (PSS) and simultaneous sector search (SSR). Both can be signaled with two reserved bits in the range B17-B23 of the SSW feedback field as shown in FIG. 15. PSS is required to perform positioning sector selection, whereas SSR is optional and accelerates sector training.

The following rules may apply for PSS ("PSS set" means positioning sector selection is desired):
1. Before PSS is set, a previous SLS phase is required, where PSS has not been set. This means that best data sectors are already known by initiator and responder.
2. When PSS is set, the first SSW frame is required to train the best data sector, i.e. the first SSW frame is sent via the best data sector which has been determined earlier. It is recommended that the second SSW frame trains the best data sector as well. This holds for both initiator sector sweep (ISS) and responder sector sweep (RSS). This ensures that the first SSW frame is received by the SSW responder so that the SSW responder can retrieve the PSS information. The SSW responder can then switch to positioning sector evaluation and retrieve best positioning sectors starting from the second SSW frame.
3. Once it is successfully negotiated, the PSS shall be stable for entire SLS.
4. If SSW initiator/SSW responder sets PSS, the SSW responder/SSW initiator shall set its PSS in the next transmitted frame in case it supports positioning sector selection and given that Sector ID and DMG antenna ID (this information resides in the SSW frame) of the first received SSW frame correspond to the best data sector which has been determined earlier. In case, the SSW responder/SSW initiator does not set its PSS, data sector search shall be performed and SSW initiator/SSW responder unsets PSS in the next transmitted frame. This enables negotiation between SSW initiator and SSW responder on PSS setting. The SSW responder/SSW initiator checks if SSW frame with best data sector has actually been received.
5. The SSW feedback field during RSS shall hold the best data sector ID. This ensures that the best data sector is available in case the SSW responder asks for PSS but the SSW initiator does not support.
6. SSW-FBK and SSW-ACK shall be transmitted with best data sector.
7. If PSS was set and agreed between SSW initiator and responder, SSW-FBK and SSW-ACK hold the best positioning sector ID in the SSW feedback field. The value of PSS in SSW-FBK and SSW-ACK shall indicate the type of best sector ID (either positioning or data). This enables positioning sector exchange.
8. If PSS was set and agreed, the first SSW frame of the initiator and responder shall be discarded for positioning sector evaluation. This is to avoid data sector evaluation of the first sector, although positioning evaluation is agreed.

The following rules apply for SSR ("SSR set" means simultaneous sector search is desired):
1. SSR can only be set if PSS is set. There is no need for a simultaneous sector search if positioning sector search is omitted.
2. Once negotiated SSR shall be stable for entire SLS (rule 3 from above).
3. If SSW initiator/SSW responder sets SSR, the SSW responder/SSW initiator shall set its SSR in the next transmitted frame (in case it supports simultaneous sector search). In case, the SSW responder/SSW initiator does not set its SSR, non-simultaneous sector search shall be performed and SSW initiator/SSW responder unsets SSR in the next transmitted frame (rule 4 from above). This enables negotiation between SSW initiator and SSW responder on SSR setting.
4. If SSR is agreed, the initiator shall respond with an "enhanced SSW-FBK" (see below).

The support of SSR requires new frame format which is called enhanced SSW-FBK. It is shown in FIG. 16B. It basically corresponds to the SSW-FBK frame as shown in FIG. 16A, but has a new frame control identifier which identifies the enhanced SSW-FBK frame and has a further SSW feedback field which shall hold the ID of the best positioning sector.

The protocol according to IEEE 802.11ad also provides the BRP phase, which allows for additional and finer sector training. The extension to support positioning can be achieved by modifying the BRP request field as shown in FIG. 17. In an embodiment a BRP-PSS indication may be added. The BRP-PSS can be set independently of the PSS in SLS, since SLS and BRP are independent. The BRP-PSS is indicated by one of the reserved bits in the BRP request field (B27-B31).

The following rules may apply for BRP-PSS:
1. The entire data in the BRP request field refers to the setting of BRP-PSS, i.e. all requests (REQ), grants, IDs refer to the positioning sector if BRP-PSS is set.
2. If the BRP request field is part of a BRP frame, the data of the entire frame refers to the setting of BRP-PSS, i.e. the BRP request itself, the DMG beam refinement field and subfields, and the channel measurement feedback field and subfields.

For some applications, it may be sufficient to do beamforming training with respect to positioning only. In those cases, a previous SLS phase which determines the best data sector is inefficient. To overcome this issue, in an embodiment use may be made of the beacon header interval (BHI) as used according to IEEE 802.11ad. During the BHI unknown stations are discovered and an initial beamforming may be done with respect to data communications. To enable a BHI where all beamforming trainings are primarily performed with respect to positioning may be used, i.e. in an embodiment one bit of the reserved bits (B62 . . . B63, as shown in FIG. 18 showing the DMG STA Capability Information field format) in the DMG STA capability information field, which indicates that positioning-BHI is supported and is occasionally transmitted. Further, one bit of the reserved bits (B44 . . . B47, as shown in FIG. 18 showing the Beacon Interval Control Field format) in the Beacon Interval Control field which indicates that the actual BHI is a positioning-BHI and the forthcoming A-BFT is a positioning A-BFT.

Furthermore, each SSW frame sent by initiator and responder may hold a PSS indicator in the SSW feedback field. In positioning-BHI, the following rules hold replacing rules from above:
1. Within a positioning-BHI, the PSS is always set by the initiator.
2. The responder sets the PSS indicator with respect to its capabilities. This is to exclude legacy STAs.
3. If the responder does not set the PSS indicator, (a) the entire beamforming training for this STA shall be discarded by not transmitting the subsequent SSW Feedback frame (this is to exclude legacy STAs and to avoid conflicts with different sector selection methods; a legacy STA interprets the missing SSW feedback frame as an access contention and will retry next BHI.) or (b) beamforming training is continued for this STA but SSW feedback with best data sector information and PSS unset (in this case the initiator must be capable of doing positioning and data sector evaluation simultaneously).

4. If the responder has set the PSS indicator, the subsequent SSW Feedback frame holds the best positioning sector information of the responder and during RSS the responder returns the best positioning sector information of the initiator.

Figure 20:
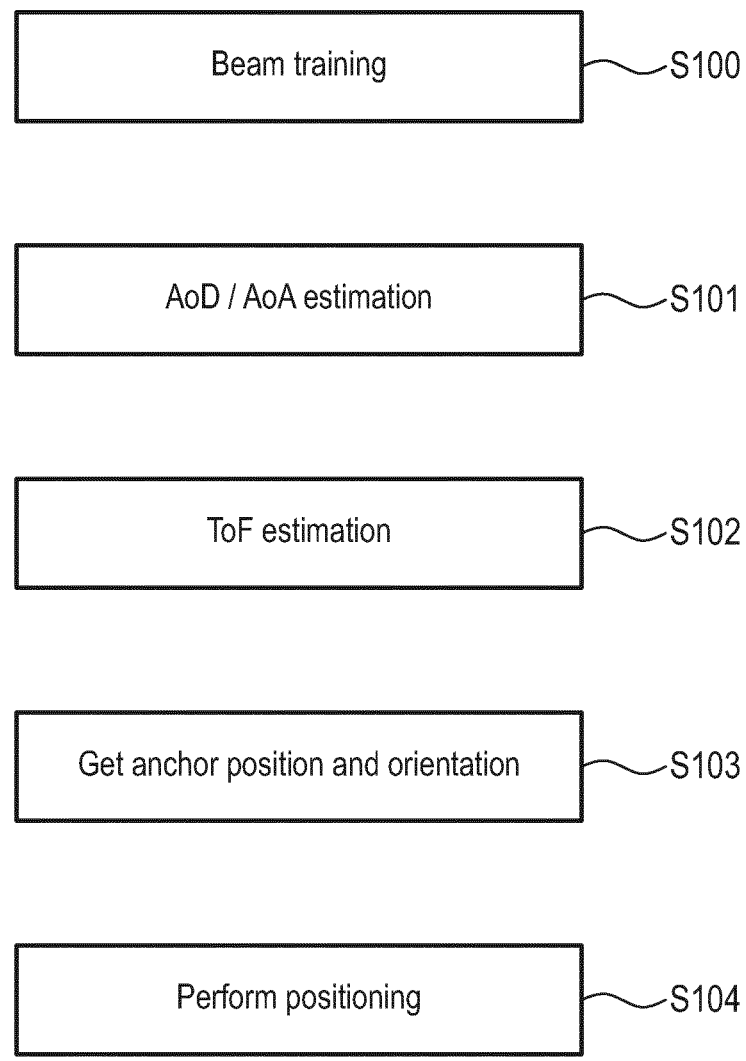
FIG. 20 shows a flowchart of a method according to the present disclosure.

An embodiment of a flowchart of an embodiment of a method according to the present disclosure is shown in FIG. 20. In a first step S100 beam training (e.g. modified SLS, BRP, adapted to positioning as disclosed herein) is performed, e.g. by determining the sector which minimizes ToA. In a second step S101 AoD/AoA estimation is performed, e.g. by determining sector information based on the estimated AoD and AoA information at each initiator and responder side. Hereby, feedback may be exchanged between the initiator and responder side if required. In a third step S102 ToF estimation (e.g. FTM) is performed, e.g. by using positioning sectors (from step S100) in the measurement phase, and message exchange is performed, including also angular information (from step S101). In a fourth step S103 an anchor position and orientation (e.g. of the responder) is obtained, e.g. by evaluating LCI (location configuration information). Hereby, step S103 can be done in advance of positioning beamforming, or it can be done occasionally only. In a fifth step S104 positioning is performed, e.g. by combining anchor position, orientation as well as ToF and angular information and, optionally, by LOS detection and/or device orientation determination.

Figure 21:
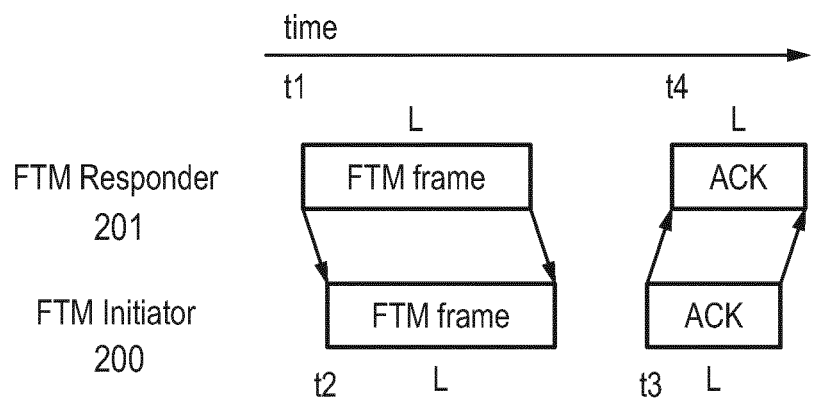
FIG. 21 shows a simplified diagram illustrating the elementary FTM message exchange according to the first or second embodiment of the fine time measurement procedure shown in FIG. 11 or FIG. 12, respectively.

FIG. 21 shows a diagram illustrating the elementary FTM message exchange in the measurement phase according to the first or second embodiment of the fine time measurement procedure shown in FIG. 11 or 12, respectively. The FTM Responder 201 transmits the FTM frame at time t1, the FTM Initiator 200 receives it at time t2. After completed reception of that frame, the FTM Initiator 200 transmits an acknowledgement frame ACK at time t3, which is received by FTM Responder 201 at time t4. FTM and ACK frame use the LOS beam for transmission and/or reception (indicated by L in FIG. 21). Furthermore, time stamps t1 to t4 are defined at the beginning of each frame. They are used to compute the round trip time (RTT) by $t_4-t_1-(t_3-t_2)$ which can be applied for positioning.

Figure 22:
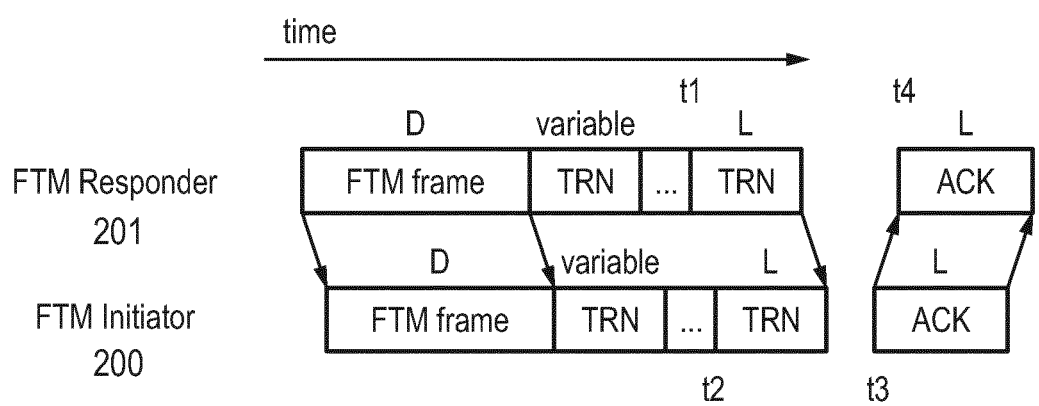
FIG. 22 shows a simplified diagram illustrating the elementary FTM message exchange according to a third embodiment of a fine time measurement procedure according to the present disclosure.

FIG. 22 shows a simplified diagram illustrating the elementary FTM message exchange according to a third embodiment of a fine time measurement procedure according to the present disclosure. A TRN (training sequence) subfield is appended to the FTM frame. The TRN subfield is well defined in the IEEE802.11ad/ay standard. It is basically a channel estimation sequence. Also several TRNs can be appended to a FTM frame. The times t1 and t2 may be defined to be at the beginning of the last TRN subfield.

TRN subfields have been defined to train different transmit and receive beams i.e. in each TRN a different beam can be applied by the transmitter or receiver. Sometimes TRN training transmit beams are called TRN-T and a TRN training receive beam is referred to as TRN-R. In the latter case, the transmitter keeps the beam unchanged but a receiver uses different receive beams for reception. The kind of training, i.e. TRN-T or TRN-R, is indicated in the preamble of the frame to which the TRN subfields are appended to.

As shown in FIG. 22, the FTM frame is sent and received using the respective data beam defined by AWVD (indicated by D in FIG. 22), i.e. a beam that is used for data communication, such as an NLOS beam along an NLOS path. Furthermore, one or more TRN fields are appended to the frame. The last TRN field, to which also the time stamp is preferably referred, is transmitted and received by a LOS beam defined by AWVP (indicated by L in FIG. 22). Preferably, all TRNs prior to the last TRN can use variable beams, i.e. can use the LOS beam or the data beam or even a further beam. Further, also the FTM frame can use variable beams, i.e. can use the LOS beam or the data beam.

The ACK may also be preferably sent and received with the LOS beam. Although the ACK may be appended by TRNs, referring the time stamps to a later TRN is not advantageous, because this deteriorates positioning performance due to clock drifts. In general, the LOS beam is preferably applied to that TRN to which the time stamps refer to.

The advantage of this scheme is that the RTT (round trip time) measurement is less vulnerable to relative clock drifts between FTM initiator and responder because the time in between measurements t1 to t4 is reduced (FTM frame is much longer and variable in length compared to a TRN subfield).

It can be envisioned that the TRNs before last TRN are used for continuous training or tracking of the LOS beam. This is elaborated in more detail below.

With respect to nomenclature, the last TRN is neither a TRN-R nor a TRN-T because transmitter and receiver change their beams to the LOS beam simultaneously. It could be referred to as a TRN-T/R.

The IEEE802.11ad amendment implements a beam tracking feature which is based on TRN sequences. In each transmitted frame, a device can request and/or perform training of beams using TRN. In general two cases can be distinguished: an initiator requests to train its receive beam (case (i)) or its transmit beam (case (ii)).

In both cases, the initiator sets a tracking request indication in the preamble of any transmitted frame, specifies training length (number of TRN subfields) and training type which is TRN-R in case (i) and TRN-T in case (ii).

Figure 23:
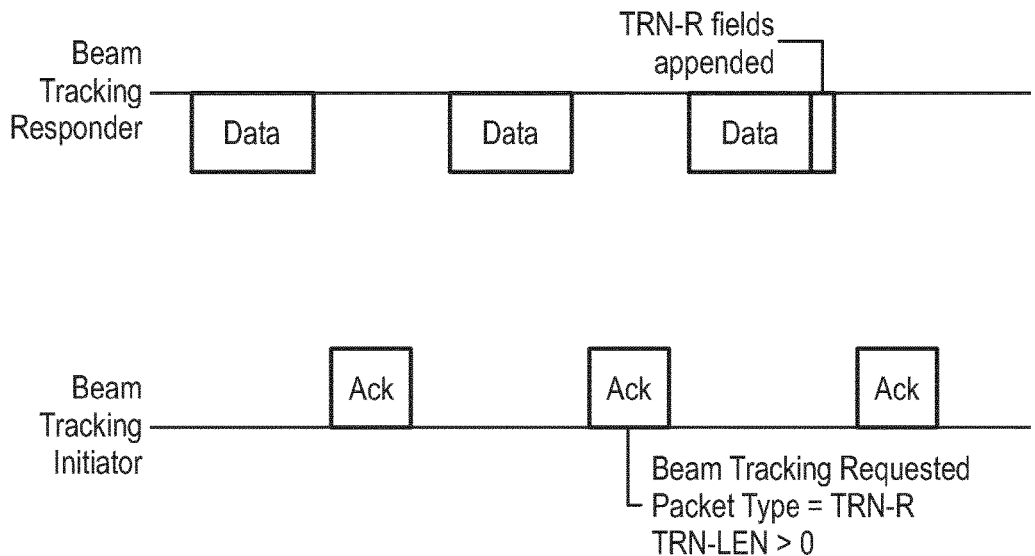
FIG. 23 shows a diagram illustrating beam tracking of receive beams.

(i) In this case, which is illustrated in FIG. 23, the responder appends TRN-R fields to the next transmitted frame intended for the initiator. During reception of the TRN of this packet, the initiator can receive with different receive beams and evaluate those beams.

Figure 24:
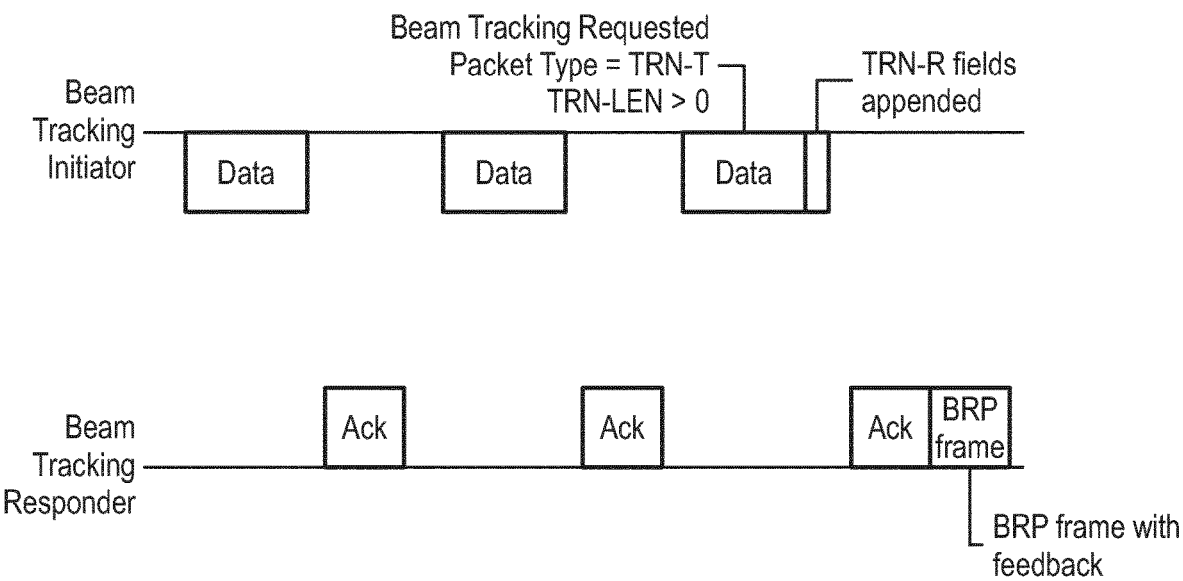
FIG. 24 shows a diagram illustrating beam tracking of transmit beams.

(ii) In this case, which is illustrated in FIG. 24, the initiator appends TRN-T fields to the current frame (i.e. that frame holding the request) and varies the transmit pattern. The responder performs evaluation and appends a feedback (e.g. BRP frame) to the next transmitted frame holding feedback information, e.g. best transmit beam of previous beam sweep.

In principle, this procedure can be also applied to track, improve or update the LOS beam for positioning. For this purpose, the only addition is an indication to request a beam tracking for the LOS beam. This indication may reside in the preamble of a frame (header) like the beam tracking request indication for the data beam. As the data beam and the LOS beam may be different, also the possible beam candidates for beam tracking (or to be trained for tracking) may be different. This shall be considered by the initiator and the responder.

Figure 25:
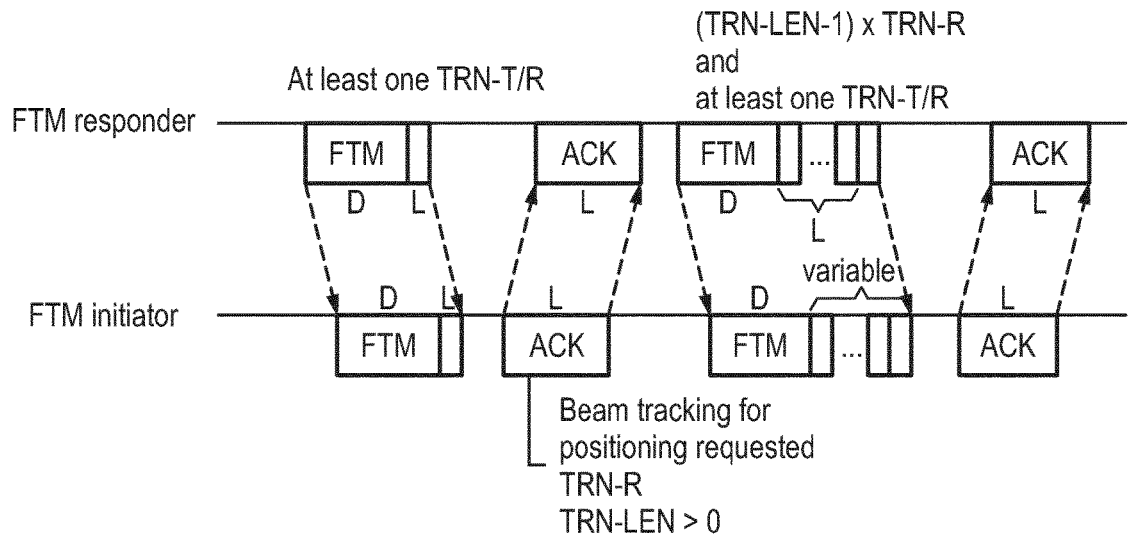
FIG. 25 shows another diagram illustrating beam tracking of receive beams.

With respect to FTM, the following two examples illustrate the procedure:

(a) This case is illustrated in FIG. 25: After having received a receiver training request in the previous ACK, the FTM responder can append TRNs which are sent using the LOS transmit beam, whereas the FTM initiator can train different receive beams in order to improve or update its LOS receive beam. Thereby, the last TRN is preferably received by a LOS beam.

Figure 26:
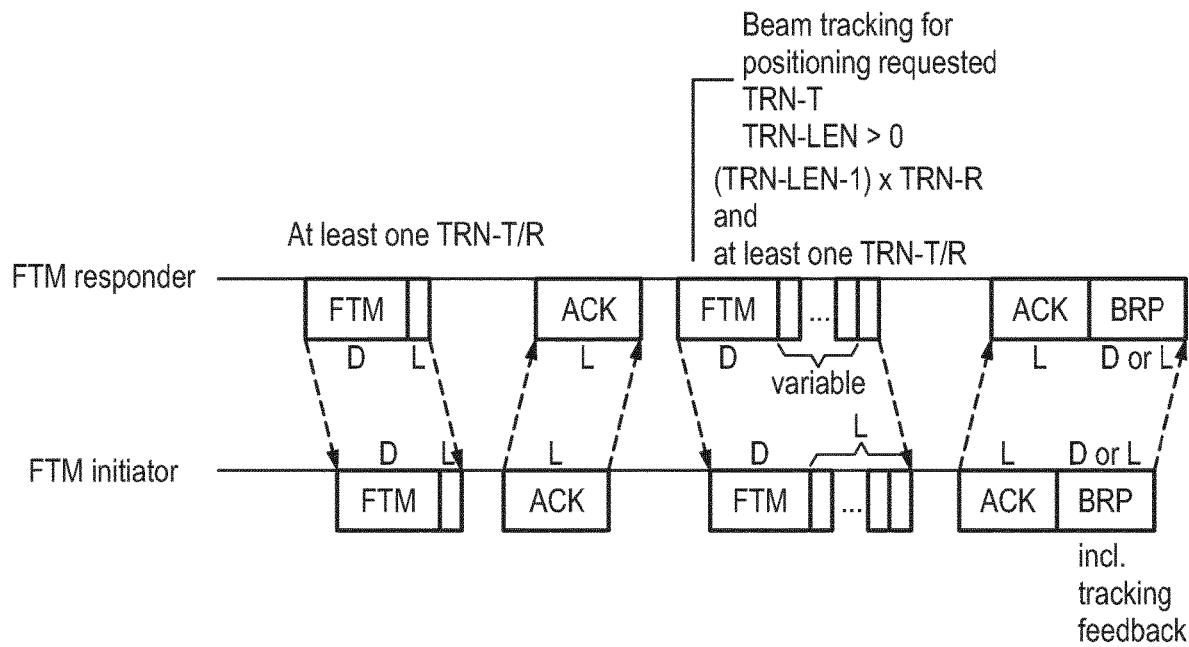
FIG. 26 shows another diagram illustrating beam tracking of transmit beams.

(b) This case is illustrated in FIG. 26: For the FTM responder to train various LOS transmit beams, the FTM responder may transmit the TRNs with various transmit beams whereas the FTM initiator receives with a fixed LOS beam. The last TRN transmitted by the FTM responder preferably uses the LOS beam. At this point, information about the "best" LOS beam is available at the FTM initiator and needs to propagate to the FTM responder by means of a feedback (e.g. BRP frame appended to the following ACK). The BRP frame can either use data or LOS beam.

FIG. 25 and FIG. 26 illustrate a training of FTM initiator receive beams and FTM responder transmit beams. Similarly, the FTM responder can train its receive beams and the FTM initiator can train its transmit beams, respectively.

According to the above described embodiments, the time information and/or angular information still resides in the FTM frame. However, the FTM frame is appended by TRN fields which are generally training fields only (i.e. no data are included, only for training purposes). Generally, however, there is the possibility that TRN space is (partly) used for data transmission. This is the so called control trailer. It may be envisioned that some time or angular information is put in the control trailer.

With the disclosed beamforming protocol the beamforming procedure defined in the current standard may be complemented to simplify position determination (e.g., by maximizing power of the LOS path). The disclosed devices can thus perform and hold relevant beam information for both communication or data exchange and positioning.

The positioning beamforming training phase may comprise a series of beams being sent, followed by estimation phases and followed by further beam refinements, according to the previous estimates, if necessary, until the LOS path is reliable enough to do angular measurements. The beamforming unit and the antenna unit may also be controlled to create beams of variable beam widths to facilitate the determination of the LOS and NLOS path.

The beamforming unit may form beams to gradually expose the LOS path and distinguish it from NLOS paths, when possible. Further, the device requiring positioning may request the anchor device to send the beams corresponding to the smallest meaningful time of arrival (ToA). Still further, it may be able to measure the ToAs of the channel paths during the sector sweep phase (when it listens with quasi-omnidirectional pattern to the beams being transmitted directionally by the other device).

Generally, angular information from either the initiator or responder is sufficient. If both is available, LOS and orientation detection is possible. Further, beamforming on only one side is generally sufficient (Tx or Rx). Having it on both sides (Tx and Rx) increases performance (regardless if the angular information is used or not, because timing information enhances). This is the above described O2O, D2O, and D2D scenario. Further, the positioning can be further improved by use of multiple responders, in which case the beamforming procedure may be repeated multiple times, i.e. for each initiator-repeater pair.

In short, the present disclosure provides for supporting positioning e.g. for e.g. DMG/EDMG (i.e. a mm-wave WLAN) by including a dedicated sector selection for positioning (which is in favor of the LOS path). One aspect of the disclosure thus is a single or multiple DMG or EDG STA, which applies different beams or sectors for data communications and positioning. Another aspect of the disclosure is a transmitter or receiver device, which applies beamforming for suppression of channel components, which hinder accurate positioning of the said device or plurality of devices.

With the devices and methods according to the present disclosure a number of advantages can be achieved, including one or more of an enhanced (simplified and more accurate) positioning for multi-antenna communication devices by applying beamforming, optimal beam selection for positioning, a device for RF positioning employing beamforming, FTM protocol enhancement for angular support, SLS and BRP enhancement for positioning sector selection, and BHI enhancement for positioning sector selection.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. A communication device (1) for RF-based communication and position determination, said communication device comprising:
   an antenna unit (10) configured to transmit and receive RF signals,
   a beamforming unit (11) configured to perform beamforming and to control the antenna unit to transmit and/or receive RF signals using one or more selected beams, a control unit (12) configured to control the beamforming unit (11) in a training phase to perform beamforming for determining an initiator line of sight, LOS, beam to a responder communication device (2), and a processing unit (13) configured to determine the initiator LOS beam and/or initiator angular information of the initiator LOS beam and to determine the position of said communication device using the determined initiator LOS beam and/or initiator angular information in a measurement phase.

2. The communication device as defined in any preceding embodiment,
wherein the processing unit (13) is configured to determine the angle of arrival and/or the angle of departure of the initiator LOS beam as initiator angular information.

3. The communication device as defined in any preceding embodiment,
wherein the processing unit (13) is configured to determine the initiator LOS beam by evaluating one or more of the time of flight of RF signals transmitted to the responder communication device, the time of arrival of RF signals received from the responder communication device and/or the receive signal power of RF signals transmitted from the responder communication device.

4. The communication device as defined in embodiment 3, wherein the processing unit (13) is configured to determine the initiator LOS beam by determining the beam resulting in the minimum time of flight or time of arrival and/or having a maximum receive power for the first arrival path above a predetermined receive power threshold.

5. The communication device as defined in any preceding embodiment,
wherein the control unit (12) is configured to control the beamforming unit (11) in a training phase to perform beamforming by performing a first sector sweep, during which RF signals are transmitted with different beams or with an omnidirectional beam pattern, and one or more further sector sweeps, during which RF signals are received and/or transmitted with different beams or with an omnidirectional beam pattern.

6. The communication device as defined in any preceding embodiment,
wherein the control unit (12) is configured to control the beamforming unit (11) and the antenna unit (10) in the measurement phase to exchange RF signals with the responder communication device (2) via a communication channel using the determined initiator LOS beam, and
wherein the processing unit (13) is configured to determine the time of flight of RF signals exchanged with the responder communication device in the measurement phase and to determine the position of the communication device from the determined time of flight and/or the initiator angular information of the initiator LOS beam.

7. The communication device as defined in embodiment 6, wherein the processing unit (13) is configured to receive responder angular information of a responder LOS beam of the responder communication device that corresponds to the LOS path between the communication device and the responder communication device and to additionally use the responder angular information for determining the position of the communication device.

8. The communication device as defined in embodiment 7, wherein the processing unit (13) is configured to receive and use the angle of arrival and the angle of departure of the responder LOS beam as responder angular information.

9. The communication device as defined in any one of embodiments 6 to 8,
wherein the processing unit (13) is configured to obtain responder position and/or orientation information of the responder communication device and to additionally use the obtained responder position information for determining the position of the communication device.

10. The communication device as defined in any one of embodiments 6 to 9,
wherein the control unit (12) is configured to control the beamforming unit (11) in the measurement phase to perform beamforming for confirming and/or updating the initiator LOS beam and the processing unit (13) is configured to confirm and/or update the initiator LOS beam and initiator angular information of the initiator LOS beam.

11. The communication device as defined in any one of embodiments 6 to 10,
wherein the control unit (12) is configured to control the beamforming unit and the antenna unit to apply a fine time measurement, FTM, procedure in the measurement phase for exchanging RF signals with the responder communication device (2), said RF signals including time information allowing the processing unit (13) to determine the time of flight of exchanged RF signals.

12. The communication device as defined in embodiment 11, wherein the control unit (12) is configured to control the beamforming unit and the antenna unit to embed the time information and/or angular information in FTM frames and/or in one or more training subfields appended to a respective FTM frame of exchanged RF signals.

13. The communication device as defined in embodiment 11 or 12,
wherein the control unit (12) is configured to control the beamforming unit (11) and the antenna unit (10) in the measurement phase to append one or more training subfields to a respective FTM frame and to exchange at least the last training subfield with the responder communication device (2) via the communication channel using the determined initiator LOS beam.

14. The communication device as defined in embodiment 13,
wherein the control unit (12) is configured to control the beamforming unit (11) and the antenna unit (10) in the measurement phase to exchange the last training subfield with the responder communication device (2) via the communication channel using the determined initiator LOS beam and to exchange the other training subfield and/or the respective FTM frame with the responder communication device (2) via the communication channel using a data beam used for data communication with the responder communication device (2), in particular a non-line-of-sight (NLOS) beam.

15. The communication defined in any one of embodiments 6 to 14,
comprising at least two RF chains, each connected to at least two antennas separated in space, wherein the control unit (12) is configured to estimate the time of arrival difference of RF signals received at said at least two antennas to compute angular orientation of the communication device with respect to the responder communication device (2).

16. The communication device as defined in any preceding embodiment,
wherein the control unit (12) is configured to control the beamforming unit (11) and the antenna unit (10) in the measurement phase to exchange RF signals with the responder communication device (2) via a communication channel using the determined initiator LOS beam, and
wherein the processing unit (13) is configured to determine the time of flight of RF signals exchanged with the responder communication device in the measurement phase and to receive the position of the communication device determined by an external entity from the determined time of flight and/or the initiator angular information of the initiator LOS beam.

17. The communication device as defined in any preceding embodiment,
wherein the control unit (12) is configured to control the beamforming unit (11) and the antenna unit (10) to append training subfields to data fields and to exchange the training subfields with the responder communication device (2) via the communication channel using the determined initiator LOS beam.

18. A communication method for use by an initiator communication device for RF-based communication with a responder communication device and for position determination of the initiator communication device, said communication method comprising:
controlling the initiator communication device (1) to perform beamforming in a training phase for determining an initiator line of sight, LOS, beam from the initiator communication device (1) to the responder communication device (2),
determining the initiator LOS beam and/or initiator angular information of the initiator LOS beam, and
determine the position of the initiator communication device using the determined initiator LOS beam and/or initiator angular information in a measurement phase.

19. A communication device (2) for RF-based communication and position determination, said communication device comprising:
an antenna unit (20) configured to transmit and receive RF signals,
a beamforming unit (21) configured to perform beamforming and to control the antenna unit to transmit and/or receive RF signals using one or more selected beams,
a control unit (22) configured to control the beamforming unit (21) in a training phase to perform beamforming for determining a responder line of sight, LOS, beam to an initiator communication device (1), and
a processing unit (23) configured to determine the responder LOS beam and/or responder angular information of the responder LOS beam and to determine the position of the initiator communication device using the determined responder LOS beam and/or responder angular information in a measurement phase.

20. The communication device as defined in embodiment 19,
wherein the control unit (22) is configured to control the beamforming unit (21) and the antenna unit (20) in a measurement phase to exchange RF signals with the initiator communication device (1) via a communication channel using the determined responder LOS beam,
wherein the processing unit (23) is configured to determine the time of flight of RF signals exchanged with the initiator communication device in the measurement phase, and
wherein the control unit (22) is configured to control the antenna unit (20) to transmit the responder angular information and/or the determined time of flight to the initiator communication device (1) or an external entity for determining the position of the initiator communication device from the determined time of flight and/or the responder angular information of the initiator LOS beam.

21. A communication method for use by a responder communication device for RF-based communication with an initiator communication device and for acquisition of information for use in position determination of the initiator communication device, said communication method comprising:
controlling the responder communication device (2) to perform beamforming in a training phase for determining a responder line of sight, LOS, beam from the responder communication device (2) to the initiator communication device (1),
determining the responder LOS beam and/or responder angular information of the responder LOS beam, and
determine the position of the initiator communication device using the determined responder LOS beam and/or responder angular information in a measurement phase.

22. A non-transitory computer-readable recording medium that stores therein a computer program product, which, when executed by a processor, causes the method according to embodiment 18 or 21 to be performed.

23. A computer program comprising program code means for causing a computer to perform the steps of said method according to embodiment 18 or 21 when said computer program is carried out on a computer.

The invention claimed is:

1. A communication device for RF-based communication and position determination, said communication device comprising:
an antenna configured to transmit and receive RF signals, and
circuitry configured to
perform beamforming and control the antenna to transmit and/or receive RF signals using one or more selected beams,
in a training phase, perform beamforming for determining a data communication beam having an optimal data communication characteristic for data communication with a responder communication device and an initiator line of sight, LOS, beam to the responder communication device,
separately determine a first antenna weight vector for the data communication beam having the optimal data communication characteristic and a second antenna weight vector for the initiator LOS beam,
determine the data communication beam having the optimal data communication characteristic, using a first criterion,
determine the initiator LOS beam and/or initiator angular information of the initiator LOS beam, using a second criterion different from the first criterion, and
upon determining the initiator LOS beam and/or initiator angular information of the initiator LOS beam, revert to use of the first antenna weight vector.

2. The communication device as claimed in claim 1, wherein the circuitry is configured to determine the angle of arrival and/or the angle of departure of the initiator LOS beam as initiator angular information.

3. The communication device as claimed in claim 1, wherein the circuitry is configured to determine the initiator LOS beam by evaluating one or more of the time of flight of RF signals transmitted to the responder communication device, the time of arrival of RF signals received from the responder communication device and/or the receive signal power of RF signals transmitted from the responder communication device.

4. The communication device as claimed in claim 3, wherein the circuitry is configured to determine the initiator LOS beam by determining the beam resulting in the minimum lime of flight or time of arrival and/or having a maximum receive power for the first arrival path above a predetermined receive power threshold.

5. The communication device as claimed in claim 1, wherein the circuitry is configured to perform the beamforming in the training phase by performing a first sector sweep, during which RF signals are transmitted with different beams or with an omnidirectional beam pattern, and one or more further sector sweeps, during which RF signals are received and/or transmitted with different beams or with an omnidirectional beam pattern.

6. The communication device as claimed in claim 1, wherein the circuitry is configured to
control the antenna in the measurement phase to exchange RF signals with the responder communication device via a communication channel using the determined initiator LOS beam,
determine the time of flight of RF signals exchanged with the responder communication device in the measurement phase, and
determine the position of the communication device from the determined time of flight and/or the initiator angular information of the initiator LOS beam.

7. The communication device as claimed in claim 6, wherein the circuitry is configured to receive responder angular information of a responder LOS beam of the responder communication device that corresponds to the LOS path between the communication device and the responder communication device and to additionally use the responder angular information for determining the position of the communication device.

8. The communication device as claimed in claim 7, wherein the circuitry is configured to receive and use the angle of arrival and the angle of departure of the responder LOS beam as responder angular information.

9. The communication device as claimed in claim 6, wherein the circuitry is configured to obtain responder position and/or orientation information of the responder communication device and to additionally use the obtained responder position information for determining the position of the communication device.

10. The communication device as claimed in claim 6, wherein the circuitry is configured to control the antenna to apply a fine time measurement, FTM, procedure in the measurement phase for exchanging RF signals with the responder communication device, said RF signals including time information allowing the processing unit to determine the time of flight of exchanged RF signals.

11. The communication device as claimed in claim 10, wherein the circuitry is configured to control the antenna to embed the time information and/or angular information in FTM frames and/or in one or more training subfields appended to FTM frames of exchanged RF signals.

12. The communication device as claimed in claim 10, wherein the circuitry is configured to control the antenna in the measurement phase to append training subfields to FTM frames and to exchange at least the last training subfield with the responder communication device via the communication channel using the determined initiator LOS beam.

13. The communication device as claimed in claim 6, comprising at least two RF chains, each connected to at least two antennas separated in space, wherein the circuitry is configured to estimate the time of arrival difference of RF signals received at said at least two antennas to compute angular orientation of the communication device with respect to the responder communication device.

14. The communication device as claimed in claim 1, wherein the circuitry is configured to
control the antenna in the measurement phase to exchange RF signals with the responder communication device via a communication channel using the determined initiator LOS beam,
determine the time of flight of RF signals exchanged with the responder communication device in the measurement phase, and
receive the position of the communication device determined by an external entity from the determined time of flight and/or the initiator angular information of the initiator LOS beam.

15. A communication method for use by an initiator communication device for RF-based communication with a responder communication device and for position determination of the initiator communication device, said communication method comprising:
controlling the initiator communication device to perform beamforming in a training phase for determining a data communication beam having an optimal data communication characteristic for data communication with the responder communication device and an initiator line of sight, LOS, beam from the initiator communication device to the responder communication device,
separately determining a first antenna weight vector for the data communication beam having the optimal data communication characteristic and a second antenna weight vector for the initiator LOS beam,
determining the data communication beam having the optimal data communication characteristic, using a first criterion,
determining the initiator LOS beam and/or initiator angular information of the initiator LOS beam, using a second criterion different from the first criterion, and
upon determining the initiator LOS beam and/or initiator angular information of the initiator LOS beam, reverting to use of the first antenna weight vector.

16. A communication device for RF-based communication and position determination, said communication device comprising:
an antenna configured to transmit and receive RF signals, and
circuitry configured to
perform beamforming and to control the antenna to transmit and/or receive RF signals using one or more selected beams,
perform beamforming in a training phase for determining a data communication beam having an optimal data communication characteristic for data communication with an initiator communication device and a responder line of sight, LOS, beam to the initiator communication device,
separately determine a first antenna weight vector for the data communication beam having the optimal data communication characteristic and a second antenna weight vector for the responder LOS beam,
determine the data communication beam having the optimal data communication characteristic, using a first criterion,
determine the responder LOS beam and/or responder angular information of the responder LOS beam, using a second criterion different from the first criterion, and upon determining the initiator LOS beam and/or initiator angular information of the initiator LOS beam, revert to use of the first antenna weight vector.

17. The communication device as claimed in claim 16, wherein the circuitry is configured to control the antenna in a measurement phase to exchange RF signals with the initiator communication device via a communication channel using the determined responder LOS beam, determine the time of flight of RF signals exchanged with the initiator communication device in the measurement phase, and control the antenna to transmit the responder angular information and/or the determined time of flight to the initiator communication device or an external entity for determining the position of the initiator communication device from the determined time of flight and/or the responder angular information of the initiator LOS beam.

18. A communication method for use by a responder communication device for RF-based communication with an initiator communication device and for acquisition of information for use in position determination of the initiator communication device, said communication method comprising:

controlling the responder communication device to perform beamforming in a training phase for determining a data communication beam having an optimal data communication characteristic for data communication with the initiator communication device and a responder line of sight, LOS, beam from the responder communication device to the initiator communication device, separately determining a first antenna weight vector for the data communication beam having the optimal data communication characteristic and a second antenna weight vector for the responder LOS beam, determining the data communication beam having the optimal data communication characteristic, using a first criterion, determining the responder LOS beam and/or responder angular information of the responder LOS beam, using a second criterion different from the first criterion, and upon determining the initiator LOS beam and/or initiator angular information of the initiator LOS beam, reverting to use of the first antenna weight vector.

19. A non-transitory computer-readable recording medium that stores therein a computer program product, which, when executed by a processor, causes the method according to claim 15 to be performed.

20. The communication device as claimed in claim 1, wherein the circuitry is further configured to determine the position of said communication device using the determined initiator LOS beam and/or initiator angular information in a measurement phase.

* * * * *